United States Patent
Israeli et al.

(10) Patent No.: US 9,562,356 B2
(45) Date of Patent: Feb. 7, 2017

(54) CONNECTOR ASSEMBLIES FOR CONNECTING PANELS

(75) Inventors: Amit Israeli, Madison, WI (US); Frans Adriaansen, Bergen Op Zoom (NL); Michael Matthew Laurin, Pittsfield, MA (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 1455 days.

(21) Appl. No.: 12/778,339

(22) Filed: May 12, 2010

(65) Prior Publication Data

US 2010/0287858 A1  Nov. 18, 2010

Related U.S. Application Data

(60) Provisional application No. 61/177,693, filed on May 13, 2009.

(51) Int. Cl.
*E04C 2/54* (2006.01)
*E04D 3/28* (2006.01)

(52) U.S. Cl.
CPC ........... *E04D 3/28* (2013.01); *E04D 2003/285* (2013.01); *Y10T 403/30* (2015.01)

(58) Field of Classification Search
USPC .............. 403/286, 265, 270, 336; 52/506.08, 52/506.09, 582.2, 584.1
See application file for complete search history.

(56) References Cited

U.S. PATENT DOCUMENTS

| | | | |
|---|---|---|---|
| 2,101,073 A | 12/1937 | Kotrbaty | |
| 2,962,133 A * | 11/1960 | Kivett et al. | ..................... 52/580 |
| 3,175,652 A | 3/1965 | Brekell et al. | |
| 3,185,267 A | 5/1965 | Pavlecka | |
| 3,210,808 A | 10/1965 | Creager | |
| 3,310,919 A | 3/1967 | Bue et al. | |
| 3,367,076 A | 2/1968 | O'Brien | |
| 4,117,638 A | 10/1978 | Kidd, Jr. et al. | |
| 4,117,640 A | 10/1978 | Vanderstar | |
| 4,251,968 A | 2/1981 | Raith et al. | |
| 4,651,488 A | 3/1987 | Nicholas et al. | |
| 4,750,310 A | 6/1988 | Holcombe | |
| 4,828,132 A * | 5/1989 | Francis et al. | ..................... 220/6 |

(Continued)

FOREIGN PATENT DOCUMENTS

| | | |
|---|---|---|
| CN | 101308881 A | 11/2008 |
| CN | 201230287 Y | 4/2009 |

(Continued)

OTHER PUBLICATIONS

German Patent No. 3214890; Publication Date: Nov. 3, 1983; Abstract Only; 1 Page.

(Continued)

*Primary Examiner* — Michael P Ferguson

(74) *Attorney, Agent, or Firm* — Cantor Colburn LLP

(57) ABSTRACT

In another embodiment, a connector assembly comprises a first side collector, comprising a first panel engagement region comprising a first receiving area that has a size to attach onto an edge of a first panel; and a second side collector, comprising a second panel engagement region comprising a second receiving area that has a size to attach onto an edge of a second panel. The first side collector and second side collector can be configured to directly mate with each other to hold to panels together.

20 Claims, 12 Drawing Sheets

(56) References Cited

U.S. PATENT DOCUMENTS

| | | | |
|---|---|---|---|
| 4,880,589 A | 11/1989 | Shigemoto et al. | |
| 5,070,662 A | 12/1991 | Niese | |
| 5,102,253 A | 4/1992 | Pugliesi-Conti et al. | |
| 5,134,827 A | 8/1992 | Hartman | |
| 5,155,952 A | 10/1992 | Herwegh et al. | |
| 5,247,773 A | 9/1993 | Weir | |
| 5,272,850 A | 12/1993 | Mysliwiec et al. | |
| 5,295,341 A | 3/1994 | Kajiwara | |
| 5,305,567 A | 4/1994 | Wittler | |
| 5,411,782 A | 5/1995 | Jarvis et al. | |
| 5,421,473 A | 6/1995 | McCrossen | |
| 5,613,338 A | 3/1997 | Esposito | |
| 5,787,642 A | 8/1998 | Coyle et al. | |
| 6,036,398 A | 3/2000 | Theodorou | |
| 6,122,879 A | 9/2000 | Montes | |
| 6,164,024 A | 12/2000 | Konstantin | |
| 6,182,403 B1 | 2/2001 | Mimura et al. | |
| 6,272,812 B1 | 8/2001 | Richardson | |
| 6,289,646 B1 * | 9/2001 | Watanabe | 52/506.01 |
| 6,295,778 B1 | 10/2001 | Burt | |
| 6,314,704 B1 | 11/2001 | Bryant | |
| 6,336,304 B1 | 1/2002 | Mimura et al. | |
| 6,536,175 B2 * | 3/2003 | Conterno | 52/584.1 |
| 6,591,557 B1 * | 7/2003 | Thomsen et al. | 52/90.1 |
| 6,719,363 B2 * | 4/2004 | Erlandsson et al. | 296/193.07 |
| 6,792,727 B2 * | 9/2004 | Krieger | 52/506.06 |
| 6,959,519 B2 | 11/2005 | Adriaansen | |
| 7,313,893 B2 * | 1/2008 | Voegele, Jr. | 52/582.1 |
| 7,441,379 B2 * | 10/2008 | Konstantin | 52/582.1 |
| 8,584,424 B2 | 11/2013 | Smith et al. | |
| 2001/0005963 A1 | 7/2001 | Richardson | |
| 2002/0108343 A1 | 8/2002 | Knauseder | |
| 2003/0024199 A1 | 2/2003 | Pervan et al. | |
| 2004/0020150 A1 | 2/2004 | Fensel et al. | |
| 2004/0261336 A1 | 12/2004 | Konstantin | |
| 2007/0251183 A1 | 11/2007 | Thiagarajan et al. | |
| 2009/0049771 A1 | 2/2009 | Konstantin | |
| 2010/0287858 A1 | 11/2010 | Israeli et al. | |
| 2012/0051833 A1 | 3/2012 | Israeli et al. | |
| 2013/0283710 A1 | 10/2013 | Laurin et al. | |

FOREIGN PATENT DOCUMENTS

| | | |
|---|---|---|
| CN | 102254970 A | 11/2011 |
| DE | 3214890 | 11/1983 |
| DE | 3604951 A1 | 8/1987 |
| EP | 0473321 A1 | 3/1992 |
| EP | 0864708 A2 | 9/1998 |
| EP | 0933490 A1 | 8/1999 |
| EP | 1111153 A2 | 6/2001 |
| GB | 206744 A | 11/1923 |
| GB | 2386636 A | 9/2003 |
| GB | 2429742 B | 1/2008 |
| JP | S6487330 A | 3/1989 |
| JP | H06264571 A | 9/1994 |
| JP | 2000129831 A | 5/2000 |
| JP | 2005277216 | 10/2005 |
| JP | 2006104718 | 4/2006 |
| JP | 2006307419 | 11/2006 |
| JP | 2007023515 A | 2/2007 |
| WO | 0037846 A1 | 6/2000 |
| WO | 0065172 A1 | 11/2000 |
| WO | 2006095201 A1 | 9/2006 |
| WO | 2006135819 A2 | 12/2006 |
| WO | 2008152637 A1 | 12/2008 |
| WO | 2010013233 A2 | 2/2010 |

OTHER PUBLICATIONS

German Patent No. 3604951 (A1); Publication Date: Aug. 20, 1987; Abstract Only; 1 Page.

International Search Report; International Application No. PCT/US2010/034485; International Filing Date: May 12, 2010; Date of Mailing: Sep. 9, 2010; 8 Pages.

Written Opinion of the International Searching Authority; International Application No. PCT/US2010/034485; International Filing Date: May 5, 2010 Date of Mailing: Sep. 9, 2010; 8 Pages.

Machine Translation of Japanese Patent No. 2005277216; Date of publication Oct. 6, 2005; 19 pages.

Machine Translation of Japanese Patent No. 2006104718; Date of Publication Apr. 20, 2006; 19 pages.

Machine Translation of Japanese Patent No. 2006307419; Date of publication Nov. 9, 2006; 25 pages.

Abstract of Japanese Patent Application No. 64-087330; Date of Publication Mar. 31, 1989; 4 pages.

Chinese Patent No. 102254970 (A); Publication Date Nov. 23, 2011; Abstract only; 2 pages.

Chinese Patent No. 201230287 (Y); Publication Date: Apr. 29, 2009; Abstract Only; 1 page.

Chinese Publication No. 101308881 (A); Publication Date: Nov. 19, 2008; Abstract Only; 1 page.

Japanese Patent No. 2000129831 A; Date of Publication May 9, 2000; Abstract only; 2 pages.

Japanese Patent No. 2007023515 A; Date of Publication Feb. 1, 2007; Abstract only; 1 page.

Japanese Patent No. H06264571 A; Date of Publication Sep. 20, 1994; Abstract only; 2 pages.

Japanese Patent No. S6487330; Publication Date: Mar. 31, 1989; Abstract Only; 1 Page.

* cited by examiner

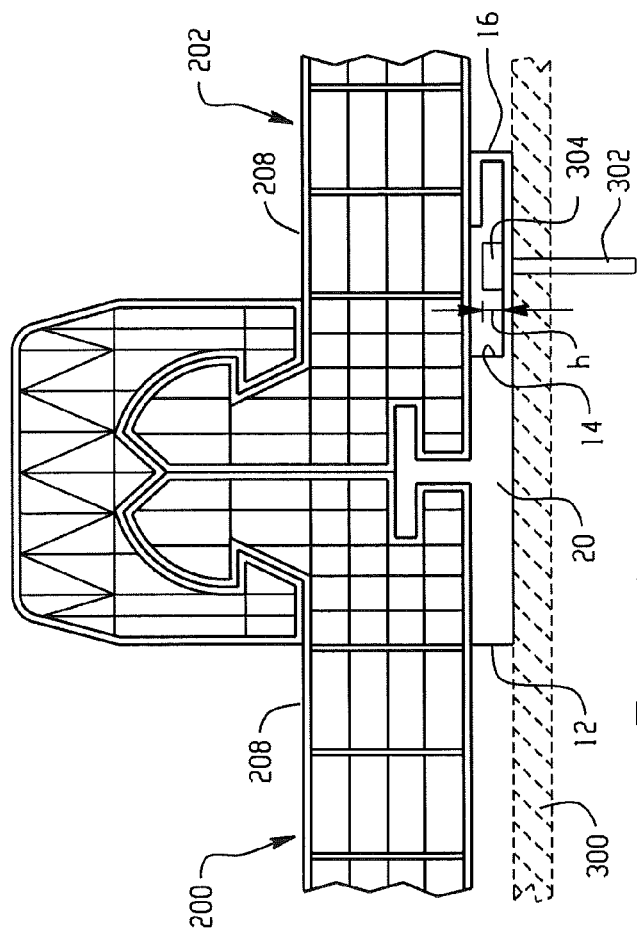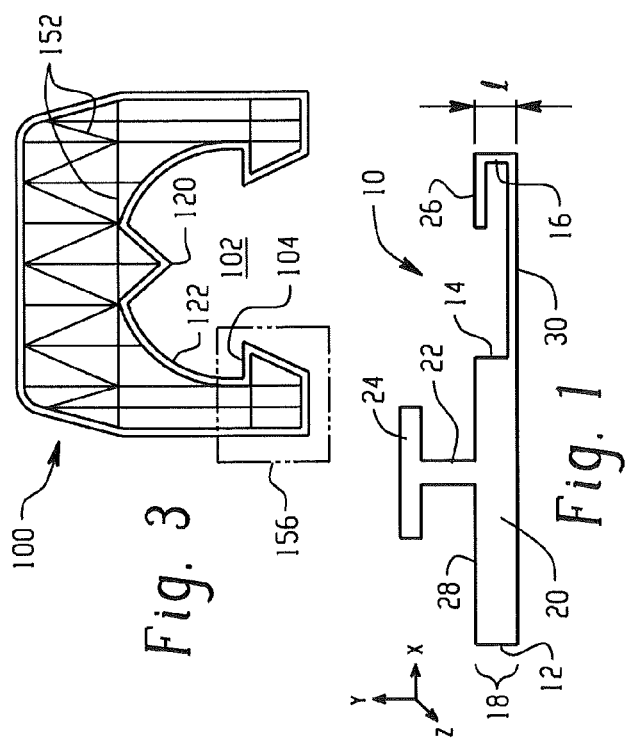

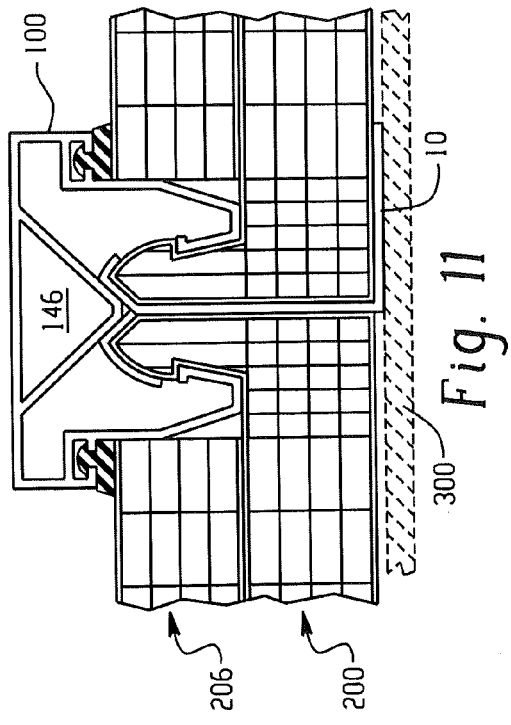
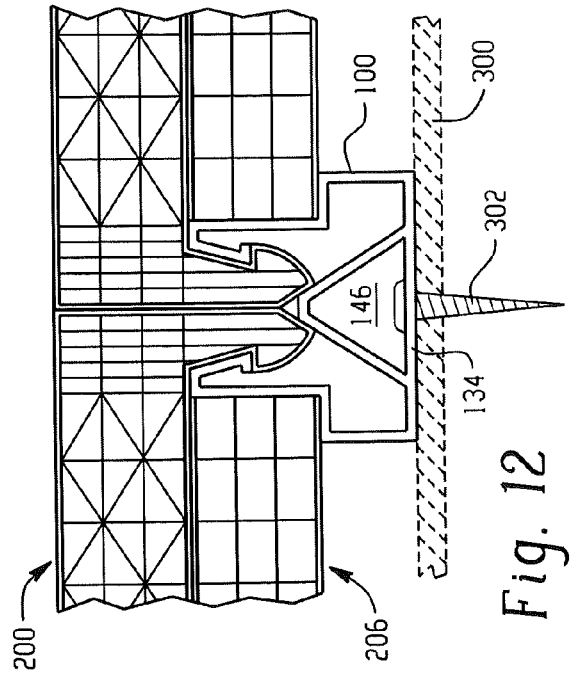
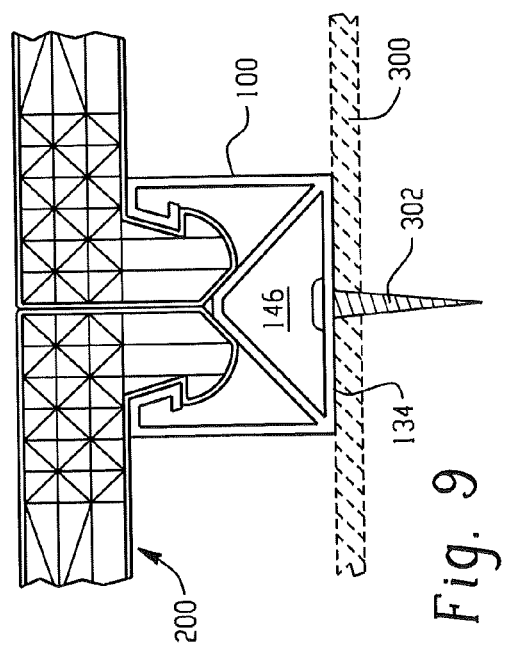
Fig. 9
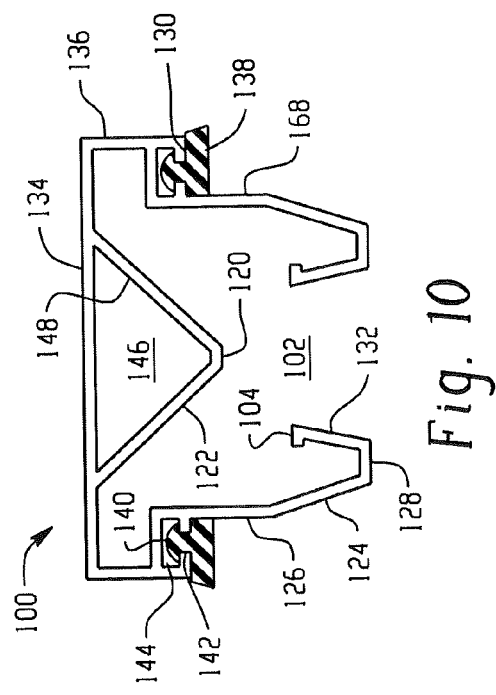
Fig. 10

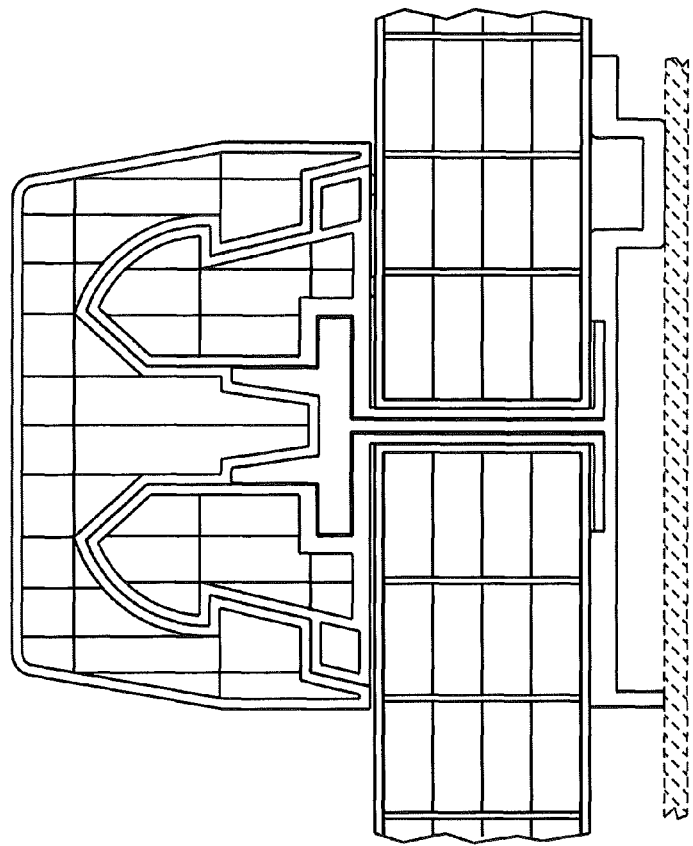
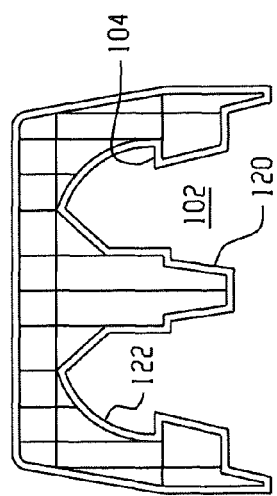
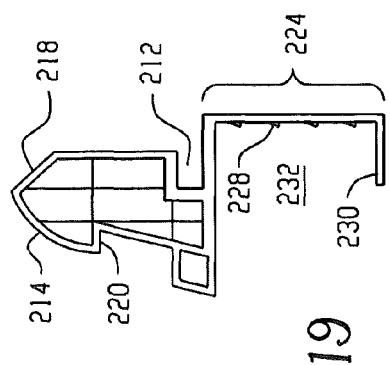
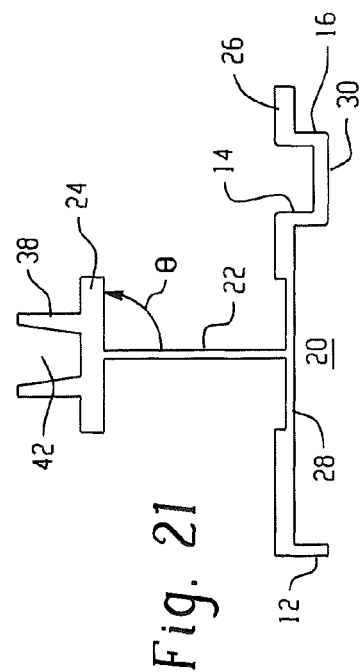

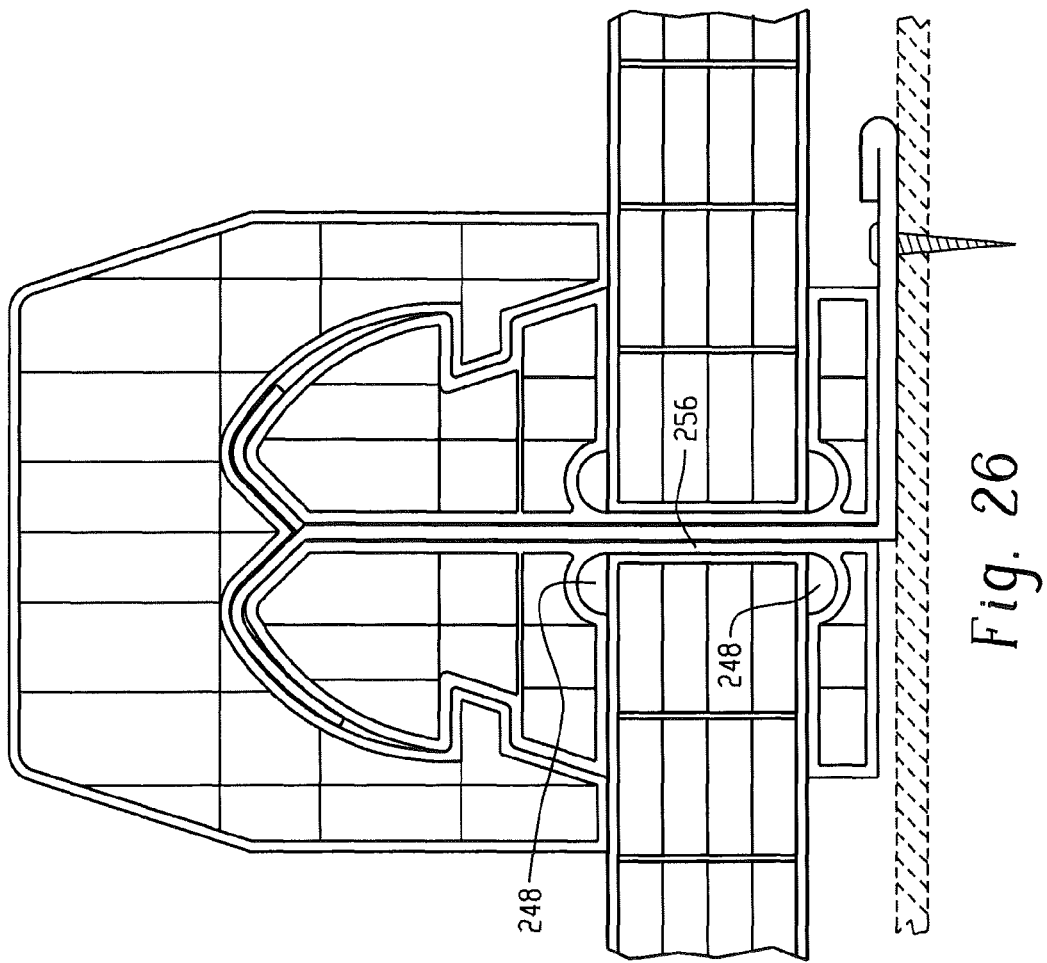

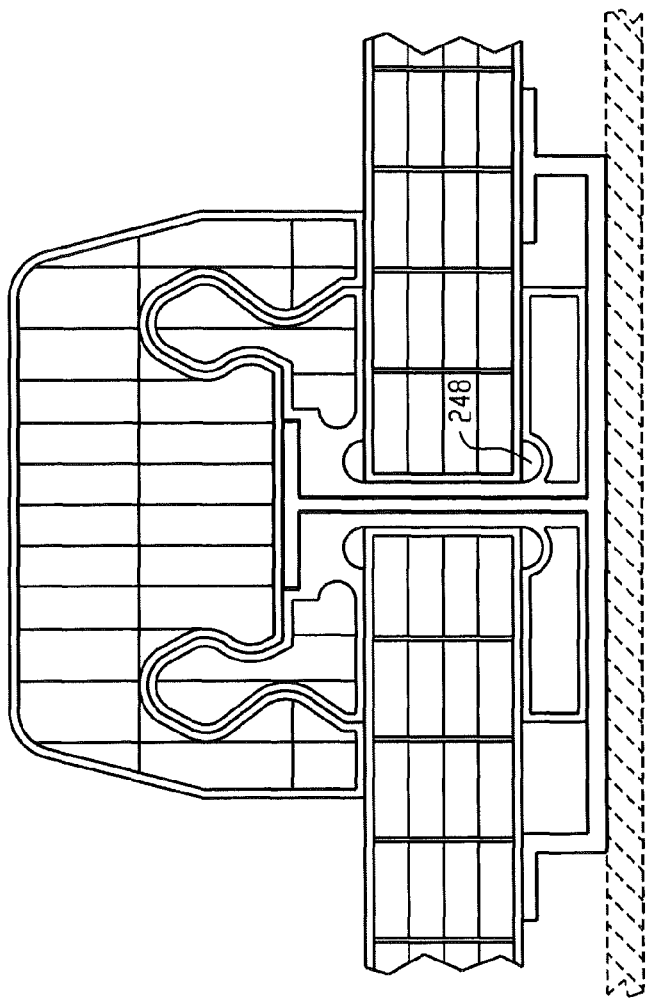
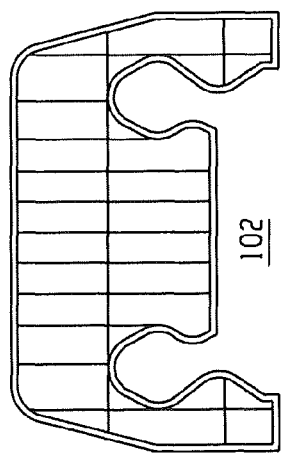
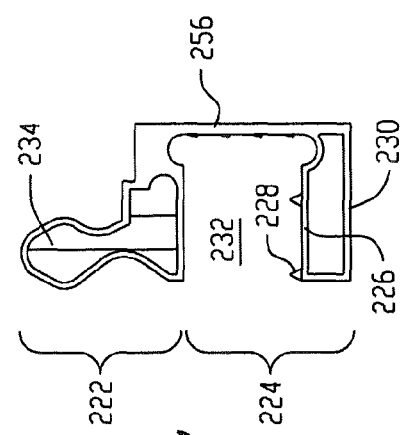
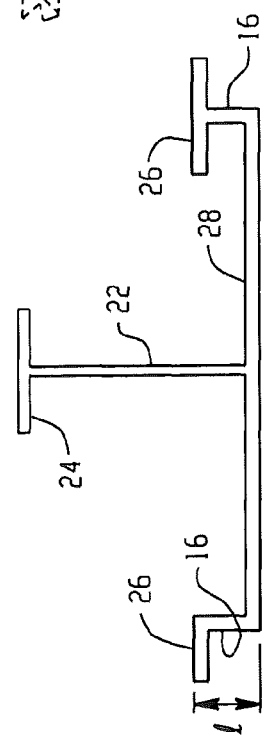

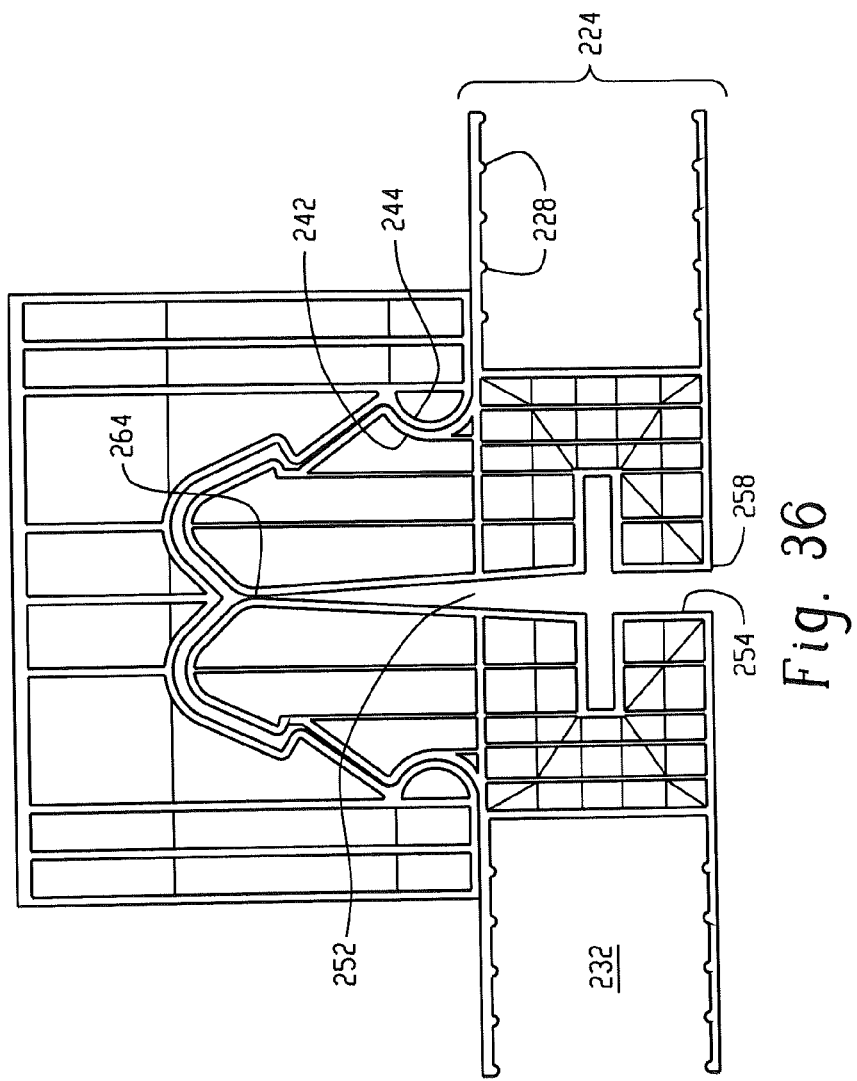
Fig. 36
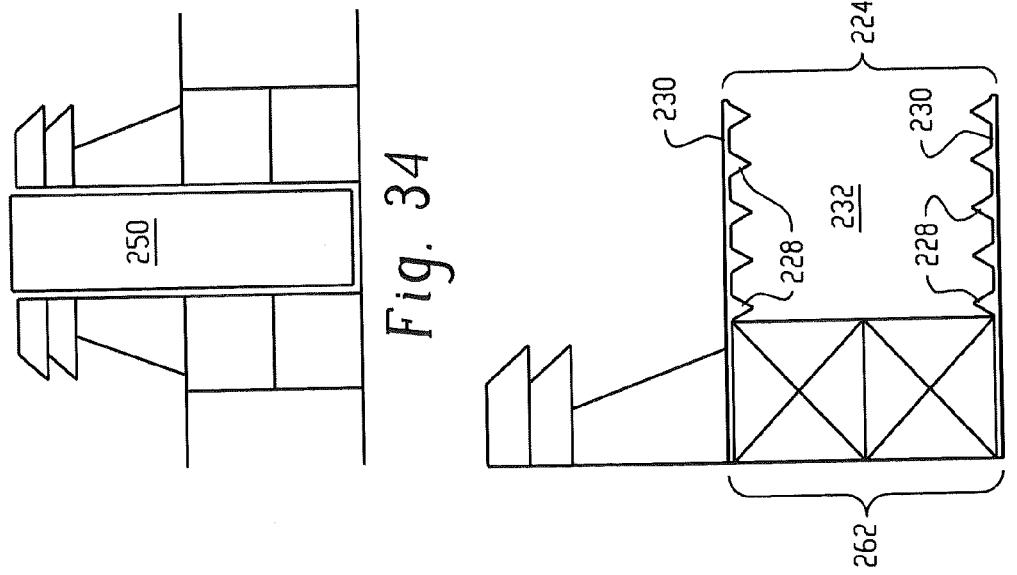
Fig. 34
Fig. 35

CONNECTOR ASSEMBLIES FOR CONNECTING PANELS

CROSS REFERENCED TO RELATED APPLICATION

This application claims benefit to U.S. Provisional Application No. 61/177,693, filed on May 13, 2009, which is incorporated herein by referenced in its entirety.

BACKGROUND

The present disclosure generally relates to connectors and collectors for connecting panels.

In the construction of naturally lit structures, such as greenhouses, pool enclosures, solar roof collectors, stadiums and sunrooms, glass panel roofs have been employed to allow natural light to shine therein. The glass panels themselves can be mounted in frame-like enclosures that are capable of providing a watertight seal around the glass panel and provide a means for securing the panel to a structure. These frame-like enclosures also provide for modular glass roofing systems that can be assembled together to form the roof.

Glass panel roofing systems generally provide good light transmission and versatility. However, the initial and subsequent costs associated with these systems limits their application and overall market acceptance. The initial expenses associated with glass panel roofing systems comprise the cost of the glass panels themselves as well as the cost of the structure, or structural reinforcements, that are employed to support the high weight of the glass. After these initial expenses, operating costs associated with the inherently poor insulating ability of the glass panels can result in higher heating expenses for the owner. Yet further, glass panels are susceptible to damage caused by impact or shifts in the support structure (e.g., settling), which can result in high maintenance costs. This is especially concerning for horticultural applications wherein profit margins for greenhouses can be substantially impacted due to these expenditures.

As a result, multiwall polymeric panels (e.g., polycarbonate) have been produced that exhibit improved impact resistance, ductility, insulative properties, and comprise less weight than comparatively sized glass panels. As a result, these characteristics reduce operational and maintenance expenses. Polymeric panels can also be formed as solid panels. Solid panels are solid plastic between their front and rear faces, and are useful where high impact resistance (e.g., bulletproofing), high clarity, and/or the ability to thermoform the panel is desired. Multiwall panels have voids between their front and rear faces, e.g., the panel may be extruded as a honeycomb with an array of passages extending along the extruded length of the panel. Multiwall panels are useful where a high insulation value, lightweight, and easy installation, are desired.

For ease of design and assembly, multiwall panels can be produced in modular systems. The modular systems comprise multiwall panels with integral panel connectors, wherein the panel connector assemblies are employed to join the panels together and/or secure the panels to a structure on which they are employed. Standard panels can also be used, which are formed continuously and uniformly, i.e., they are extruded slabs and are cut to size and installed in the same manner as glass. These standard panels require a frame or the like to hold them in place.

Modular panels are advantageous for their extreme ease of installation, but are disadvantageous owing to their limited versatility in that modular panels cannot be cut to a desired size if such cutting involves loss of a connecting edge, because the modular panel will no longer be readily connectable to other panels at the cut edge. As a result, if a panel with an unusual or non-standard width is desired, a new extrusion die must be commissioned, at great expense, so as to be able to extrude panels of the desired width, and having the desired connecting edges. Further, modular panels are naturally limited to use with modular panels having complementary attachment structure (i.e., a tongue-and-groove panel will connect to other tongue-and-groove panels having the same tongue/groove configuration, but will not connect to standing seam panels).

Thus, greater flexibility in the size of the modular panels, without the requirement for expensive equipment and retooling, and the ability to connect to a variety of panels is desired.

BRIEF DESCRIPTION

Disclosed herein are side collectors and connector assemblies and methods for connecting panels with the side collectors and/or connector assemblies, methods for making the side collectors and/or connector assemblies, and panels using the side collectors and/or connector assemblies.

In one embodiment, a connector assembly can comprise: a connector and a pair of side collectors. Each side collector can comprise a connector engagement region having a size and geometry to mate with the connector so as to hold ends of two adjacent panels together, and a panel engagement region comprising a receiving area having an energy director extending into the receiving area, and having a size to attach onto an edge of the panel.

In another embodiment, a connector assembly can comprise: a first side collector, comprising a first panel engagement region comprising a first receiving area that has a size to attach onto an edge of a first panel; and a second side collector, comprising a second panel engagement region comprising a second receiving area that has a size to attach onto an edge of a second panel. The first side collector and second side collector can be configured to directly mate with each other to hold to panels together.

In yet another embodiment, a connector assembly can comprise: a pair of side collectors, and a connector having a support and an extension protruding therefrom. Each side collector can comprise a cavity that when assembled with the other side collector forms a connector engagement region, and a panel engagement region comprising a receiving area having a size to attach onto an edge of the panel. The extension and the cavity can have a size and shape to enable the extension to be inserted into the cavity so as to hold ends of two adjacent panels together.

In an embodiment, a connector can comprise: two cavities defined by flexible walls, wherein each of the cavities has a geometry and is configured to mate with connector engagement regions from a pair of side collectors; and a header located between the two cavities. The cavities can enable two sets of panels to be stacked and connected with the connector.

In an embodiment, a side collector comprises: a connector engagement region comprising head having a size and geometry to mate with a panel connector; and a panel engagement region comprising a receiving area having an energy director extending into the receiving area, and having a size to attach onto an end of a panel.

Embodiments of panel assemblies comprise any of the connector assemblies attached to panels.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same. It is noted that various elements of the embodiments are interchangeable with other embodiments as long as collectors and if used, clip, are matable and/or, for side seams, the connector and associated collectors, and if used, clip, are mateable, as would be readily understood. However, for simplicity, not every single combination has been illustrated.

FIG. 1 is a front view of a clip for use in assembling a structure.

FIG. 2 is a cross-sectional end view of a panel with an integrated side collector.

FIG. 3 is a front view of a connector for use in assembling a structure.

FIG. 4 is a front view of FIG. 1 to FIG. 3 assembled.

FIG. 9 is a front view of FIG. 5 and FIG. 7 assembled in an inverted fashion with the connector attached to the support.

FIG. 10 is a front view of a connector for use in assembling a structure.

FIG. 11 is a front view of an assembled structure with integrated side collectors connecting stacked panels.

FIG. 12 is a front view of an assembled structure with integrated side collectors connecting stacked panels, wherein the connector is attached directly to the support, i.e., without a clip.

FIG. 19 is an elevation view of a panel and an un-integrated side collector.

FIG. 20 is a front view of a connector for use in assembling a structure.

FIG. 21 is a front view of a clip for use in assembling a structure.

FIG. 22 is a front view of FIG. 19 to FIG. 21 assembled.

FIG. 23 is an elevation view of a panel and a side collector not integrated with the panel.

FIG. 24 is a front view of a connector for use in assembling a structure.

FIG. 25 is a front view of a clip for use in assembling a structure.

FIG. 26 is a front view of FIG. 23 to FIG. 25 assembled.

FIG. 27 is an elevation view of a panel and a side collector separate from the panel.

FIG. 28 is a front view of a connector for use in assembling a structure.

FIG. 29 is a front view of a clip for use in assembling a structure.

FIG. 30 is a front view of FIG. 27 to FIG. 29 assembled.

FIG. 34 is a front view of a standing seam side collector with a spacer between collector halves.

FIG. 35 is a side view of a standing seam side collector with extensions having energy directors and a panel to be connected thereto.

FIG. 36 is a front view of an assembled connector and side collectors with a thermal expansion clearance.

DETAILED DESCRIPTION

Figure 8:
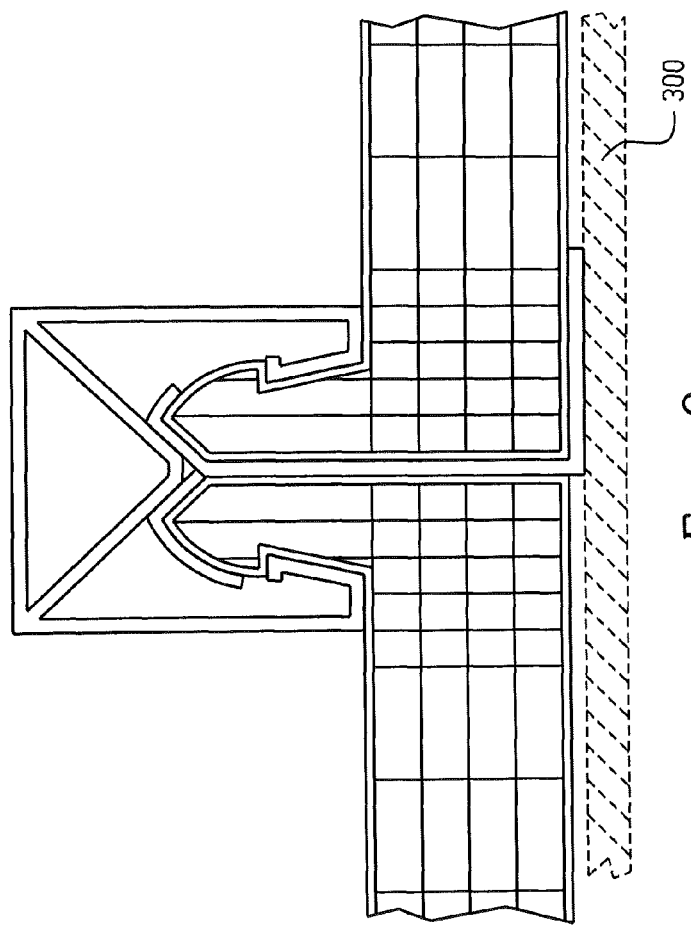
FIG. 8 is a front view of FIG. 5 to FIG. 7 assembled.
Figure 5:
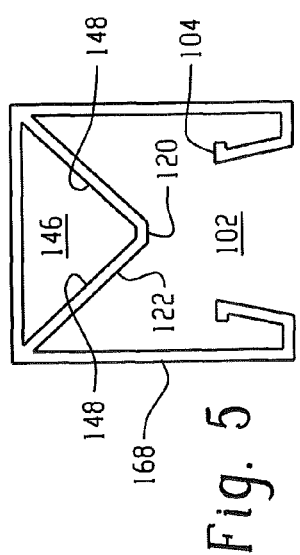
FIG. 5 is a front view of a connector for use in assembling a structure.

Disclosed herein are various embodiments of connector assemblies, e.g., connector(s) and collector(s), and optionally clip(s). The connectors can attach to a support via the clip or can connect directly. The connectors can also be single or double sided; e.g., can be capable of engaging one or two sets of collectors, and optionally of engaging the ends of one or two additional panels with no collectors. The collectors can be integral with the panel (formed as part of the panel, e.g., as a single, unitary component), or separate from the panel as an independent component. If the collector is a separate component, many different width panels (e.g., measured in the X direction) can be used with the same collector and connector. Additionally, many different thicknesses (measured in the Y direction) and/or different width panels can be used with the same connector by using different, separate collectors. Additionally, the optional clips can be designed to enable the panels to be level when assembled (in the Y direction).

The connector assemblies generally comprise a connector, a side collector, and optionally a clip for attaching panels together. The connectors and collectors are designed as mating pairs with one acting as the male and the other as the female connector. In many of the embodiments illustrated in the figures, the connector is illustrated as the female component, while the collector is illustrated as the male component. It is noted that this is merely for illustration and ease of discussion. The opposite configuration is also covered herein and contemplated hereby, wherein the connector is the male component and the collector is the female component (e.g., see FIG. 37). Therefore, the discussion of the cavity for the connector and the connector engagement region for the collector can readily be reversed and is hereby understood.

The connector can be designed with a cavity that has a size and shape to mate with a pair of side collectors (from adjacent panels) in order to hold the panels together. The specific size and shape of the cavity is dependent upon the size and shape of the side collectors. Desirably, the connector securely attaches to the panels, over the side collectors. In other words, the size of the cavity can be about equal to the size of the side collectors such that when the connector is assembled onto the side collector, physical contact between the outer surface of the side collector and the inner surface of the cavity is attained (e.g., over greater than or equal to 80% of the outer surface of the collector). It is noted that when a clip is utilized having an engagement (e.g., cross-member 24, wings 36) that will be located between the connector and the collector, the size of the collector inner surface is sufficient to enable the engagement to be located between the connector and collector. For ease of installation and minimization of the use of fasteners, the connectors can be designed to snap-fit onto the collectors (e.g., see FIG. 4), to slide onto the collectors from an end of the panel (e.g., see FIG. 30), and/or to otherwise attach.

It is noted that the connector is complementary to the combination of collectors to which is connects. However, both collectors do not need to be identical. Different collectors can be used on each panel so long as the connector is designed to receive that combination of collectors.

Figure 40:
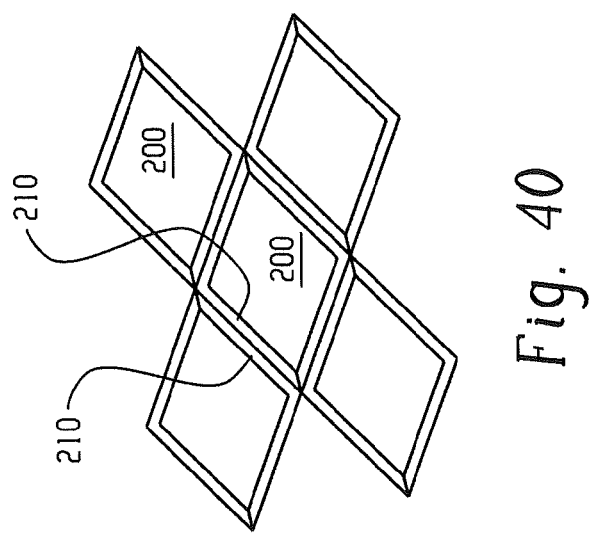
FIG. 40 is a top view of assembled panels illustrating that with the side collectors, the panels can be assembled on all four sides.

Further, panels using the side collector(s) (and/or connectors) disclosed herein can have all of their edges—not just two opposing edges—bearing attachment structures. (See FIG. 40) For example, panels for a wall might bear edge connectors with standing seams where the horizontal panel edges are to be joined, and edge connectors with tongue and groove attachments where the vertical panel edges are to be joined.

For example, referring to FIGS. 1-4, the connector 100 has a cavity (interior portion 102) with a size and shape complementary to two side collectors 210 arranged adjacent to one another such that the collector assembly (two adjacent side collectors) can be inserted into the cavity 102. For example, such that the peaks 216 and slopes of the adjacent side collectors form a valley that receives the connector protrusion 120. Similarly, complementary flange 104 and ledge 220 of the connector 100 and collector 210, respectively, can be in physical contact when the connector is attached to the panels.

As can further be seen in FIGS. 10 and 11, the connector can have an angled portion 124 that decreases the connector diameter toward the base 128 so as to enable the connector to be snap-fit onto side collector, optionally even in the presence of multiple panels. For example, the panels 200 and 206 can be stacked and/or arranged accordingly, with clip 10 extending from the support structure 300 to the outer portion of the collector, slide region 214. Then, the connector 100 can be forced over the side collectors 210 such that the arms 132 contact the slide region 214, forcing the walls 168 (e.g., comprising leg(s) 126 and angled portion(s) 124) outward toward the panels 206 until the flange 104 moves past the edge of ledge 220. When the flange 104 moves past the edge of ledge 220, the connector snaps onto the side collector, whereby the walls 168 would move back inward, toward the side collector and away from the panel. In the various designs of the connector, the walls 168 can be designed to have a sufficient length such that, once the connector has been attached to the side collectors, the base (e.g., base 128) physically contacts the panel surface. In the snap-fit embodiments, the walls 168 can have a sufficient flexibility to enable the walls to deflect outward as the side collectors are inserted into the cavity.

Similar snap-connection of the connector 100 occurs when the clip 10 is not utilized. Without the clip 10, the connector 100 can be directly attached to the support 300. The side collectors 210 can then be forced into the cavity of the connector 100, thereby causing the legs 126 to move outward, allowing the arms 132 to travel across the slide region 214 until the flanges 104 engages the ledges 220.

The connector can be configured to attach to multiple panels as is illustrated in FIGS. 11-12. In this design the connector further comprises a panel attachment that extends from the leg 126 away from the base 128 forming a ledge 130 with a member 136 connecting the ledge 130 to the header 134. The member 136 can extend from the header 134 at any desirable angle so as to form a sufficient ledge 130 to enable the additional panel to be securely engaged by the connector 100. Although the ledge 130 could directly engage the additional panel 206 with optional adhesive disposed therebetween (e.g., see FIG. 12), in this illustration, the connector further comprises a gasket 138 configured to form a pressure fit between the connector 100 and the second panels 126. The gasket 138 can be attached to the connector 100 in any fashion, including a mechanical connection such as illustrated. For example the head 140 of the gasket 138 can be located in a space 144 such that the diameter of the head 140 is greater than the diameter of the opening 142 into the space 144 through ledge 130. Thereby, the gasket 138 is not unintentionally removed from the space 144. As is illustrated, the gasket 138 extends from the space 144 to the area between the ledge 130 and the panel 206.

In embodiments that do not employ clip(s), the connector can be located between the panels and the support, attaching the panels to the support. For example, as is illustrated in FIGS. 9 and 12, the clip 10 (see FIGS. 8 and 11) has been eliminated and the fastener 302 attaches the connector 100 to the support 300 via the header 134. In order to allow the insertion of the fastener 302 into the connector 100, the protrusion 120 can have a sufficiently large opening to enable the insertion of the fastener 302 into the chamber 146 defined by sides 148, e.g., the opening can be larger than the diameter of the fastener head. The sides 148 can optionally be employed to provide further structural integrity to the connector 100, and/or an alignment element (protrusion 120) for alignment with the collectors 210 and/or clip 10.

Figure 13:
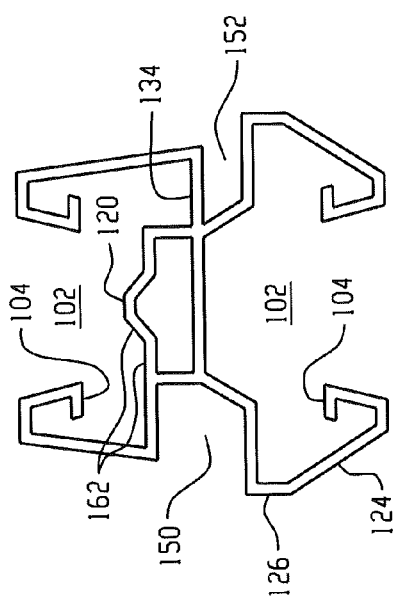
FIG. 13 is a front view showing panels with integrated side collectors, a double-sided connector, and additional panels without integrated side collectors.
Figure 14:
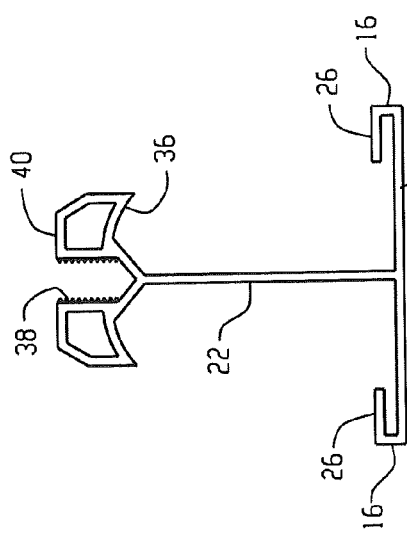
FIG. 14 is a front view of a clip for use in assembling a structure.
Figure 16:
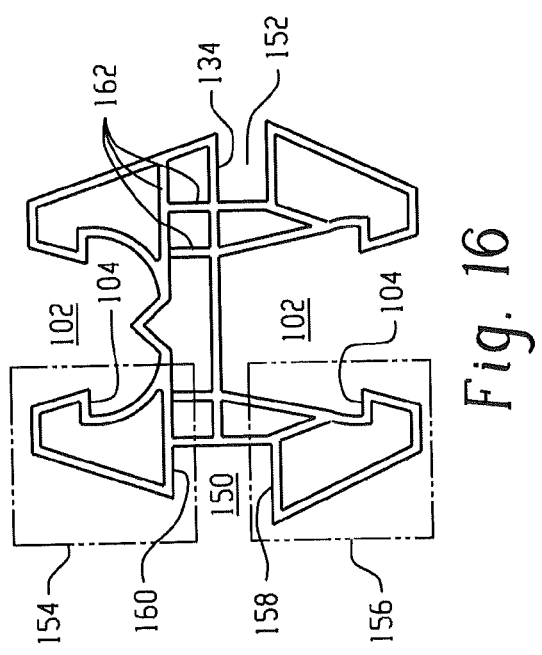
FIG. 16 is a front view showing panels with integrated side collectors, a double-sided connector, and additional panels without integrated side collectors.
Figure 17:
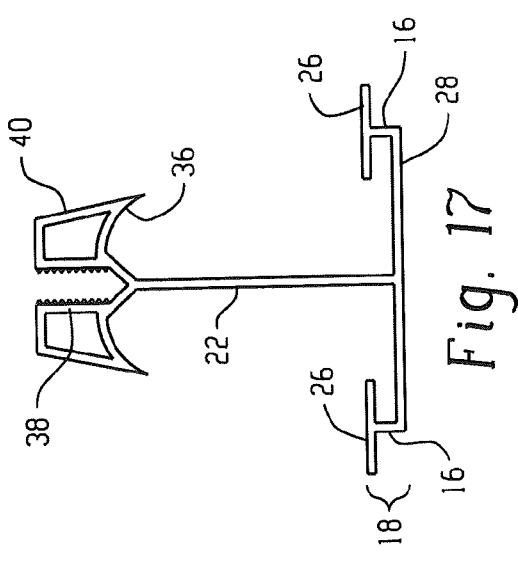
FIG. 17 is a front view of a clip for use in assembling a structure.

Some embodiments of the connectors 100 are "double" connectors, i.e., they have cavities 102 on two opposite sides for receiving pairs of side collectors (e.g., see FIGS. 13 and 16). In these embodiments, a cavity 102 is located on each side of the header 134. Each of these cavities 102 comprises the flanges 104 to engage the ledges 220 of the side collectors 210. As with the other connectors 100, each cavity 102 of the double connectors are configured to mate with a specific pair of side collectors 210 and therefore has a complementary inner geometry that matches the outer geometry of the side collectors (or, as is mentioned above wherein the connector is the male element, the connector will have a complementary outer geometry to match the inner geometry of the collector, wherein the collector will extend from the end of the panel). As is clear from the exemplary embodiments illustrated in the figures, each of the connectors in the double connector does not have to be identical. A combination of different connectors can be used. As can be seen from FIG. 16, the connector can have different shaped cavities 102 that are configured to receive the same shaped pairs of side collectors. It is also contemplated that different shaped pairs of collectors can be received in each cavity that is shaped accordingly. Here, the difference in shape is to enable the additional receipt into one of the cavities, the clip engagement (e.g., cross-member(s) 24 and/or wing(s) 36).

In addition to different cavity geometries, the connectors can comprise different outer geometries, thereby enabling them to receive additional panel(s), e.g., panel(s) that do not have a side collector. Optionally, slot(s) (e.g., slots 150,152) can be formed between the cavities 102. The size and geometry of these slot(s) is dependent upon the thickness of the panel(s) intended to be inserted into the slot(s). Note, it is desirable to only have slot(s) on the side(s) of the double connector intended to receive additional panels. The presence of a panel in the slot stabilizes the sides 154,156 of the double connector, preventing flexing of the side(s) after installation of the panel. In other words, while the side collectors 210 are inserted into the cavities 102, the sides 154,156 (accordingly), of the double connector, are forced outward, causing the edges 158,160 (accordingly) defining the slot(s) to move into the slot. Once the flange 104 passes the end of the slide region 214 to the ledge 220, the sides 154,156 move back out of the slot(s) 150,152. Hence, if a snap-fit arrangement is employed, the side collectors are inserted into the double connector prior to the insertion of the additional panels. Furthermore, if a fastener is employed, the set of side collectors located between the connector and the support are inserted first to enable the attachment of the fastener 302 to the flange(s) 38. Then the second set of side collectors are inserted into the open cavity 102 prior to the insertion of the additional panel(s). The additional panels can have a thickness that enables a compression fit in the slot, e.g., without damaging the end of the panel. Such a fit will prevent inadvertent removal of the panel from the slot and will stabilize the sides 154,156 against movement upon the application of force to the panels.

Figure 15:
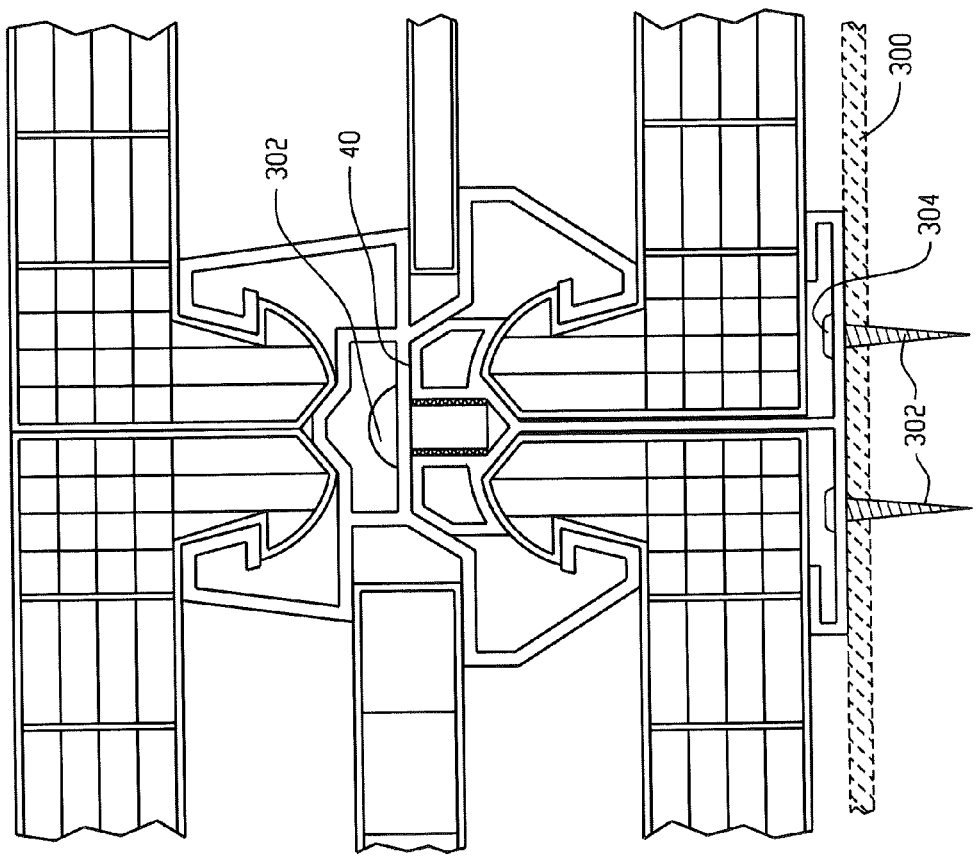
FIG. 15 is a front view of FIG. 13 and FIG. 14 assembled.
Figure 18:
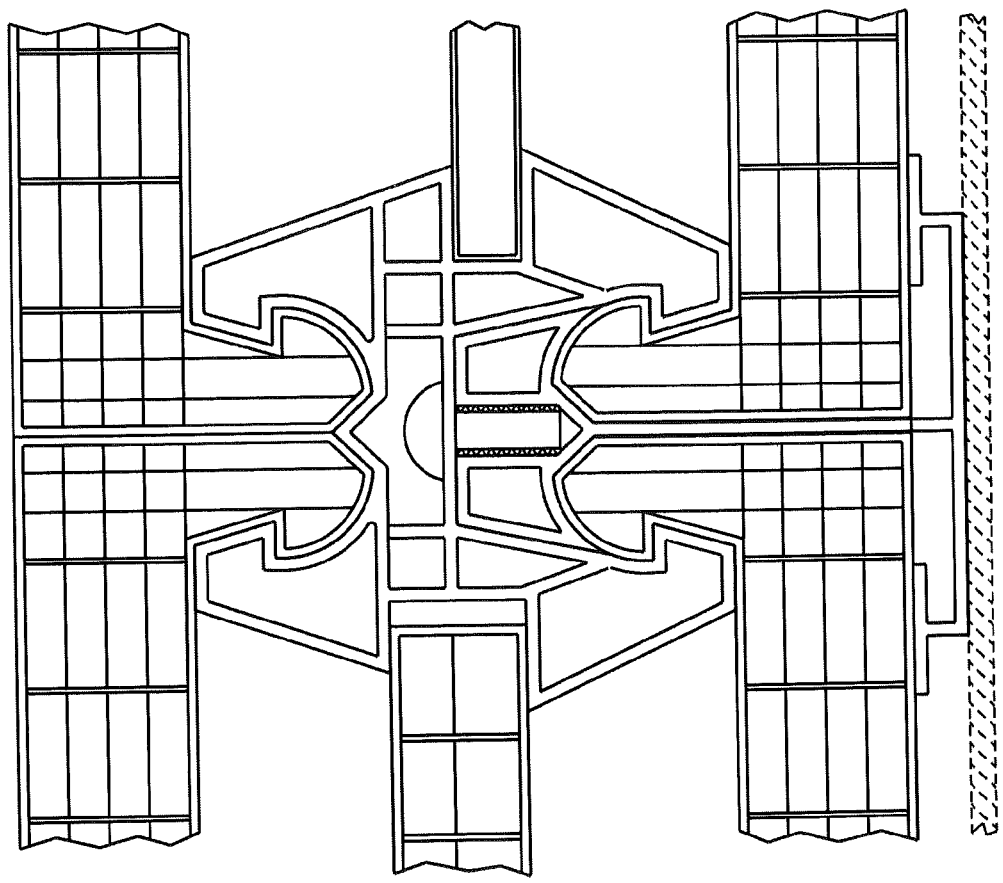
FIG. 18 is a front view of FIG. 16 and FIG. 17 assembled.

As is illustrated in FIGS. 15 and 18 and mentioned above, the end of panels (without collectors) can be inserted into the slot(s). This creates an arrangement, in the Y direction, of panels with collectors (e.g., first set of panels), gap (e.g., fluid gap such as air), panel without collector, gap (e.g., fluid gap such as air), panels with collectors (second set of panels). Since the sizes of the slots are different, different thickness panels are located on each side of the double collector. In embodiments that employ the double connector, a clip can optionally be employed to provide attachment of the first set of panels to a support 300. In addition, the clip may further comprise flange(s) 38 configured to receive fastener(s) 302. Hence, one or both of the connectors of the double connector can be configured to receive fastener(s) to enable further securement of the connectors (and hence the panels) to the support. In other words, in addition to the snap connection via the side collectors of the first set of panels, the retention of the connectors can be further enhanced via direct attachment of the header of the double connector to the flange(s) 38 of the clip 10.

Some further exemplary embodiments of additional connectors are set forth in FIGS. 20, 24, 28, and 36. These embodiments further illustrate that the specific size and geometry of the connector is only limited by the size and geometry of the side collectors (and, if employed, clip) to which it will be connected. Also, as is clear with respect to the panels and the side collectors, the connectors can optionally comprise various combinations of ribs 162 (e.g., horizontal, vertical, diagonal, and any combination thereof) as is desired, e.g., for additional structural integrity (e.g., see FIGS. 1 and 16). Any rib arrangement is based upon desired structural integrity for the particular connector, based upon where the connector will be employed and the loads it will experience.

The side collector(s) are located at the end of the panel, wherein adjacent side collectors (from adjacent panels) form the seam between the panels to be connected. As noted above, the side collectors can have various designs that are complementary to the design of the connector and clip so as to enable the collectors (male portion; connector engagement region 222 with a head 234) to mate with the connector (female portion; cavity 102) (or collectors (female portion) to mate with the connector (male portion)).

The specific geometry of the collectors are dependent upon the geometry of the connector to which they will be mated. Some exemplary geometries are illustrated in FIGS. 2, 7, 19, 23, 27, 31, and 35. As can be seen in these figures, the collectors can optionally comprise rib(s) 226 (e.g., vertical, horizontal, and/or diagonal (e.g., see FIG. 31)), to enhance the structural integrity of the collector. It is also noted that the density of the ribs (number of ribs per unit area), can be greater than the density of the ribs in the panel (if the collector is separate) or in the remainder of the panel (if the collector is integral). Diagonal ribs, for example, can be used along with vertical ribs and horizontal ribs in the area adjacent the panel engagement region, e.g., see FIG. 31. In this embodiment vertical ribs and horizontal ribs are employed throughout the side collector, with diagonal ribs only located in the area adjacent the panel engagement region (e.g., no diagonal ribs are used in the connector engagement region).

Figure 32:
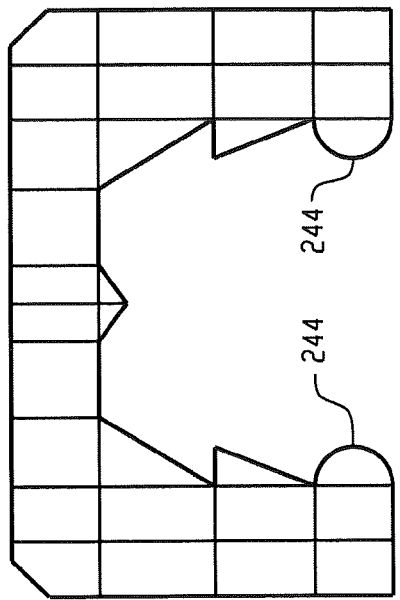
FIG. 32 is a front view of a connector for use with the collector of FIG. 31.
Figure 33:
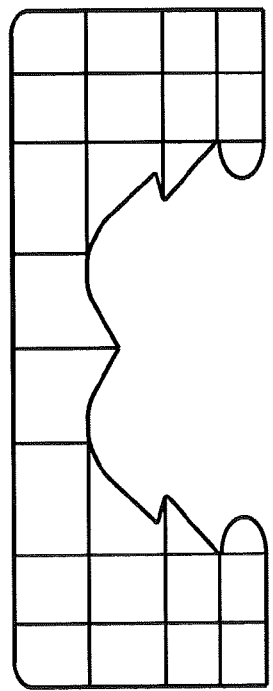
FIG. 33 is another front view of a connector.
Figure 31:
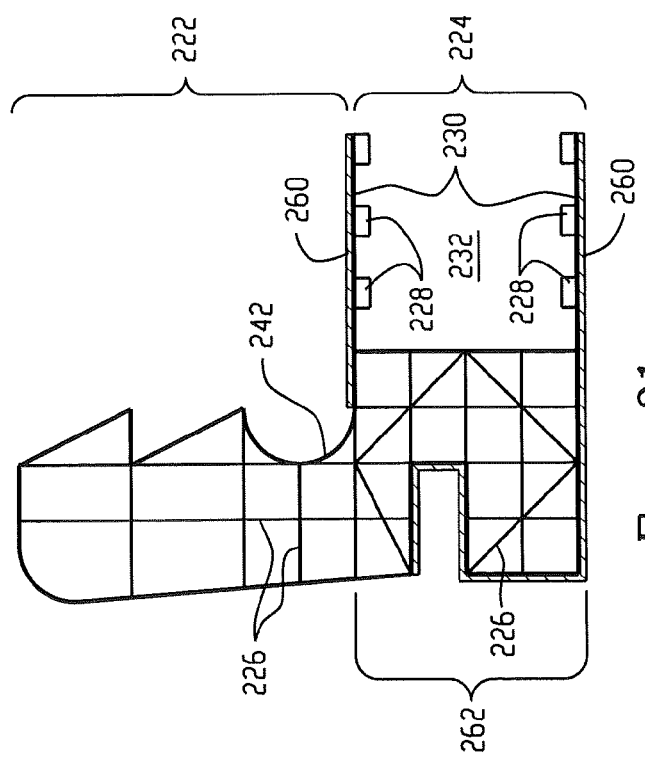
FIG. 31 is a side view of a standing seam side collector.

Optionally, the side collector(s) and/or connectors can have barrier elements to enable water, air, and/or bug infiltration resistance. These barrier elements can comprise a ridge and a valley, wherein the mating ridge and valley are rounded components. For example, they can form greater than or equal to 40% of a circle, specifically, greater than or equal to 50% (e.g., can form a semicircle). Exemplary barrier elements are illustrated in FIGS. 31 and 32, wherein the barrier valley 242 on FIG. 31 is configured to mate with the barrier ridge 244 on FIG. 32. As is illustrated, the barrier valley 242 can be located on the connector engagement region 222, adjacent to the panel engagement region 224, e.g., in contact therewith.

As noted, the side collectors can be an integral part of the panel (e.g., see FIG. 2), or a separate component (e.g., see FIG. 19), e.g., a side collector formed separate from the panel and later attached to the panels (e.g., after manufacturing of the panel is complete). Non-integral side collectors, such as tongue and groove, base and cap, and standing seam side collectors are advantageous in that panel sizes (e.g., length, width, height, and/or thickness) are not limited by sizes that are already produced because of cost issues associated with creating, testing, and validating a new die system to produce the desired size. With non-integral side collectors, any size and combination of panels and/or sheets can be used, since the side collectors are produced separate from the sheet and attached at a later time (e.g., at or close to the job site). Additionally, different shape side collectors can be used to attach different panels of a system (e.g., roof) together. This enables the side collectors and connectors to be customized for the particular location and desired properties (e.g., to enhance structural integrity, sound dampening, and/or light transmission, etc.) Non-integral side collectors are additionally advantageous in that they essentially convert a standard panel (e.g., a planar panel with no side collector) into a modular panel. These side collectors can have a structure configured to wrap around an edge of a panel, (e.g., a U-shape) and be sized to receive the thickness(s) of the panel(s) to be fit therein. These side collector(s) can be welded (e.g., ultrasonically and/or thermally), chemically attached (e.g., chemically bonded or glued), and/or mechanically attached (e.g., screwed, bolted, riveted, etc.) and/or otherwise affixed to the panel(s).

As discussed above, the side collectors have a complementary design to the connectors so as to enable mating thereof. In many embodiments, these components can be snap-fit together. Hence, the side collector 210 comprises an area that enables the connector to readily move over the surface of the side collector, such that when a force is exerted on the connector toward the side collector, the sides 156 of the connector flex outward, away from the cavity 102 (see FIGS. 2-4). This enables the connector engagement region 222 to enter the cavity 102 until the flange 104 contacts the ledge 220, thereby allowing the sides 156 to move back toward the cavity 102.

Alternatively, in the various embodiments, if flexing of the sides 156 of the connector is not possible and/or not desirable, the connector can be disposed onto the collector by placing the side collectors of two panes adjacent to one another. The connector and collectors can be moved together (e.g., in the Z direction), sliding the connector and collectors together (e.g., sliding the connector engagement region 222 into the cavity 102).

When the collector is a separate element from the panel, it comprises a panel engagement region 224 (see FIGS. 19, 23, 27, 31, 35, and 36). The height of the panel engagement region 224 is sufficient to enable an end of a panel to be inserted therein (e.g., is sized to receive the thickness(es) of the panel(s) to be fit therein (see FIGS. 22 and 30)). Depending upon the design of the collector, the receiving area 232 can be defined by the connector engagement portion 222, arm(s) 230, and/or rib(s) 226. For example, in FIG. 19, the receiving area 232 is defined by the connector engagement portion 222 and arm 230. In FIG. 27, the panel engagement region 224 has an arm 230, but the receiving area 232 is defined by the connector engagement portion 222 and rib 226. In FIGS. 31, 35, and 36, the receiving area 232 is defined by arms 230. In some designs, the arms 230 extend outward, e.g., from the connector engaging area (see FIGS. 31, 34-39), e.g., such that the panel engagement region comprises a body portion 262 which is located adjacent to the connector engaging region (see FIGS. 31, 34, and 35) and arm(s) 230 extending from the body portion 262, forming receiving area 232 for attachment onto an edge of a panel. In other embodiments, the arms 230 are located in alignment with the connector engaging region (see FIGS. 19, 23, and 27), e.g., such that the panel engagement region is located adjacent the connector engaging region (e.g., the panel engagement region is formed by the arms 230 (which may be multiwalled), and no body portion).

Within the panel engagement region 224 can be energy director(s) 228 extending into the receiving area 232. These energy directors can be configured to engage an outer surface (e.g., surface 208) of the panel to which the collector will be attached. The energy directors can aide in grasping and retaining the panel in the receiving area 232 and/or can redirect energy received by the collector and/or panel (e.g., during welding (e.g., ultrasonic welding and/or thermal welding) together of the collector and panel) into the ribs 198 of the panel. Therefore, desirably, some or all of the energy directors 228 are located in the receiving area 232 so as to align with vertical ribs (e.g., ribs extending in the Y direction) in the panel when the panel is inserted into the receiving area 232. The energy director(s) can be located on one or both horizontal surfaces (surfaces extending in the X direction) in the receiving area 232. To inhibit the arms from detaching from the panel, and/or to avoid moisture, air, and/or insect infiltration, an energy director can be located at the end of each arm 246. Furthermore, it was discovered that the strongest bond between an attachment member and a multiwall panel came about when an energy director was positioned directly over a vertical rib in a multiwall structure. Energy director(s) can be used on the vertical surface when the panel has a closed end (e.g., is not open to the individual ribs), and has horizontal ribs).

It was also discovered that using multiple energy directors was advantageous because it increased the odds of having an energy director over a rib in a multiwall panel without having to modify the panel itself. The number of energy director(s) employed can be different on each horizontal surface (and optionally the vertical surface), and can vary depending upon the length of the horizontal surfaces, the amount of vertical rib(s), if any, (and, if on the vertical surface, the amount of horizontal ribs) in the panel, and/or the amount of force that will be exerted onto the collector and/or panel when they are assembled together. For example, in the case of the multiwall panel, greater than or equal to 2 energy directors are generally employed on each horizontal surface, specifically, greater than or equal to 4, more specifically, greater than or equal to 5, and yet more specifically, greater than or equal to 8. Although any geometry can be employed for the energy director 228, a generally triangular geometry is employed, e.g., a right triangle extending into receiving area (such as from the arm(s) 230). The height of the energy director (e.g., the distance the energy director extends from arm 230 into receiving area 232) can vary. Generally the height is less than or equal to 5 mm (millimeters), specifically, 0.25 mm to 2 mm, more specifically, 0.5 to 1 mm.

The energy directors can be formed as an integral part of the collector (i.e., an extension from arm 230, not an attachment to arm 230). Furthermore, to enhance compatibility between the collector and the panel, the energy director(s) can be formed from the same type of material as the panel, or can be a composition comprising the same type of material as the panel. For example if the panel is a polycarbonate panel, the energy director(s) can be polycarbonate, or a composition comprising polycarbonate, such as a polycarbonate and ABS.

Not to be limited by theory, it is believed that the energy directors pinpoint the energy of the vibrating ultrasonic horn to a small area between the side collector and panel causing the energy director to melt and subsequently fuse the side collector and panel together with a strong chemical bond made from melted material. Without the energy directors, the ultrasonic horn would vibrate, heat, and compress a large unmelted side collector into the panel, crushing a multiwall panel or creating a very weak bond with a solid panel. In addition or alternative to the welding, the side collectors 210 can also be attached to panel by chemical and/or mechanical methods (e.g., gluing, chemical bonding, fastener(s), and combinations comprising at least one of the foregoing).

Bonding a separate side collector to a panel can comprise inserting the edge of the panel into the receiving area of the side collector until the edge contacts the vertical wall and/or the panel cannot be inserted any further. Creating relative motion between an ultrasonic welding horn and the arms of the side collector so as to melt the energy director(s) and form a bond between the arm and the panel surface.

To address thermal expansion of the panels, the side collectors can have a joint side with an angled wall (e.g., angled from the connector engagement region toward the receiving area) such that, when assembled, the joint walls 254 form a joint (e.g., space 252) having a decreasing width from the base 258 toward the connector engagement region 222 (see FIG. 36). In other words, the joint wall can be non-perpendicular, as determined with respect to the arm 230. The joint walls form a space having a converging diameter from the base 258 toward the connector engagement region 222, and optionally all the way to the point 264 adjacent the end of the joint wall 254 opposite the base 258. The size of the space formed by the adjacent walls should be sufficient to enable the thermal expansion of the panels to which the side collectors are attached. Essentially, as the panels thermally expand, they would exert a force on the side collectors, causing the side collectors to move toward each other. As the side collectors move toward one another, the width (as measured in the X direction), of the space decreases. The space can have a width (as measured in the X direction, and in the relaxed state (i.e., when no force is applied due to thermally expanding panels)), at the base 258, of greater than or equal to 1 mm, specifically, 2 mm to 10 mm, and more specifically, 2.5 mm to 5 mm.

Alternatively, or in addition to the joint 252, a spacer 250 can be located between adjacent joint walls 254. The spacer can comprise a flexible material that can be compressed by expanding panels, e.g., a foam or elastomeric material (see FIG. 34). The spacer can have a sufficient size and compressibility to allow for the thermal expansion of the panels. For example, the spacer can have a thickness (measured in the X direction and in the non-compressed state) of greater than or equal to 1 mm, specifically, 2 mm to 10 mm, and more specifically, 4 mm to 8 mm.

When the side collector is to be used with an alignment clip that will not engage the outer surface of the side collector and/or the connector, the side collector has an opening 212 to receive the cross-member 24 of the clip 10 (e.g., see FIGS. 2, 31, and 36). This opening is located in the joint wall 254 adjacent the receiving area 232.

Figure 6:
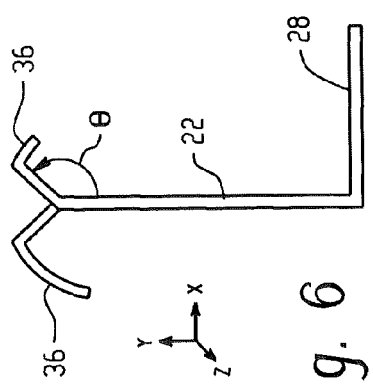
FIG. 6 is an elevation view of a clip for use in assembling a structure.
Figure 7:
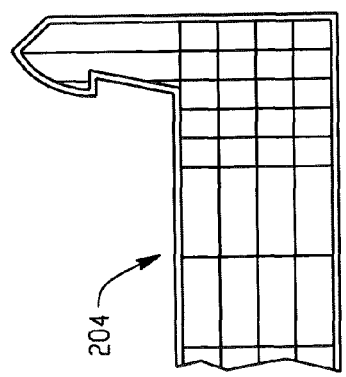
FIG. 7 is a front view of a panel with an integrated side collector.

As is mentioned, a clip can optionally be employed with the connector and collectors. Different types of clips are possible. For example, the clip can be an alignment clip (e.g., see FIG. 1), an engagement clip (e.g., see FIGS. 6 and 25), and/or a combination clip (e.g., FIGS. 14, 17, 21, and 29). Hence, the clip can comprise an alignment region that is designed to align the adjacent panels such that when the panels are attached together, they are level. For example, in FIG. 1, the clip 10 is illustrated as comprising a cross-member 24 at one end of stem 22 and a base 18 at the other end. The base 18 can have a foot 28, side(s) 12, 14, leg(s) 16, area 20, support(s) 26, and/or tab(s) 32, e.g., the base can form a "u" shape (e.g., with a side 14, leg 16, and arm 30 (see FIGS. 1 and 21), or with legs 16 and foot 28 (see FIG. 29)). The tab(s) 32 can help to provide space for the head of the fastener that can be attached through the clip. For example, as is illustrated in FIGS. 1, 4, and 21, the base can comprise sides 12,14 (extending in the Y directing away from the engagement) defining area 20 (which can be hollow (see FIGS. 1) or solid (see FIG. 4)), with arm 30 extending from the side 14 to leg 16 (which extends in the Y direction toward the engagement). The foot 28 can extend away from stem 22 in one or both direction, e.g., forming a L-shaped foot (see FIGS. 6 and 25) or a T-shape (see FIGS. 1, 14, 17, 21, and 29), with the stem, respectively. The T-shaped stem allows even alignment of the assembled panels since both of the adjacent panels are held the same distance from the support. However, the L-shaped foot only extends along one panel and hence does not support the panels evenly when assembled (e.g., the panels will be offset by the thickness of the foot 28 and, if present, the tab 32).

When the clip 10 is assembled onto adjacent panels 200, 202 (see FIG. 4), side 12 is adjacent the first panel 200, while side 14 is adjacent the second panel 202. Arm 30 can be used to attach the clip 10, and hence the panels 200,202, to a support 300 using fastener(s) 302. Similarly, when an arm 30 is not present, fastener(s) 302 can be attached to the support 300 through the foot 28 (see FIG. 15). Exemplary fasteners include a bolt, screw, nail, rivet, nut, peg, glue, two-sided tape, as well as combinations comprising at least one of the foregoing. Exemplary supports include a beam (e.g., purlin, I-beam, rectangular beam, etc.), piling, wall, a rafter, post, header, pillar, roof truss, as well as combinations comprising at least one of the foregoing.

In order to prevent the panels 200,202 from being unlevel due to the presence of the fastener 302, the side(s) 12,14, and/or leg(s) 16 have a length "l", and/or the solid area 20 has a thickness, that is greater than or equal to the height "h" that the fastener head 304 extends from the linear portion 22 toward the panels. If there is a difference in the thickness of the panels (in the Y direction), the side(s) 12,14, and/or leg(s) 16 have a length "l", and/or the solid area 20 has a thickness (as is appropriate), to compensate for the difference in the panels' thicknesses, such that, when the panels, connector, and clip are assembled together, the outer surface 208 of the panels are level with one another; they are aligned. In other words, the side(s) 12,14, and/or leg(s) 16 have different length "l", and/or the solid area 20 has a different thickness, wherein the difference in the length/thickness is equal to the difference in the panels' thicknesses.

Further structural integrity can be attained in the clip via the use of an optional extension from the leg(s) 16 and/or sides 12,14, e.g., support 26. Lateral extension(s) 26 (e.g., see FIGS. 1, 14, 17, 21, and 29) can be employed with the various embodiments of the clip, wherein the lateral extension(s) can extend toward and/or away from the adjacent panel to which the clip is connected. For example, the lateral extension(s) can extend toward and/or away from the stem 22 (in the X direction). These extension(s) can provide support to the panel as well as can inhibit air, water, and/or insect infiltration.

At the end of the stem 22 opposite the foot 28 is an engagement that can be located in an opening in the side collector and/or can contact a surface of the side collector. Exemplary engagements include a cross-member 24 (see FIGS. 1, 21, and 29), wing(s) 36 (see FIGS. 6, 14, 17, and 25), and/or receiver 40 (see FIGS. 14, 17, and 21). In various embodiments, the engagement can have a generally T-shape (e.g., the cross-member 24 is located perpendicular to the stem 22), and/or can be arcuate (e.g., extending from the stem 22 in a manner complementary to the shape of the side collector outer surface 214); such as wing(s) 36. Hence, the engagement can be configured to be located in an opening in the side collector (see FIGS. 3 and 4, opening 212 in side collector 210), or can, when assembled, be located between the side collector (e.g., the outer surface 214) and the connector (e.g., the inner surface 122) (see FIG. 26, wing(s) 36 contacting surface (slide region) 214). When the engagement is configured to be located in the opening 212, the stem has a length that is less than the height of the receiving area (e.g., both measured in the Y direction). In other words, the stem has a length that is less than the thickness of the panel that will be received in the receiving area 232.

The cross-member 24 can extend out from the stem 22 in the "X" plane (e.g., see FIGS. 1, 21, and 29), in one or both directions (e.g., positive and negative) and the distance in each direction can be the same or different. Similarly, one or more wings can extend from the stem 22 along the "X" plane, in one or both directions, with the length of the wings being the same or different (see FIGS. 6, 17, 21, and 25). Larger wing widths provide higher wind loads. The desired width of the wings (e.g., from the end of one wing to the end of the other wing), is therefore dependent upon the intended application and desired structural integrity. Wing spans of up to and exceeding 50 mm can be employed, specifically spans of 5 mm to 40 mm, and more specifically spans of 10 mm to 30 mm.

With respect to the angle at which the cross member (and wings) extend from the stem 22, it is also determined based upon desired structural integrity and the desired shape of the side collector to which the clip will connect. The cross-members can extend from the stem at an angle θ of 85° to 95°, with an angle of 90° desirable to enable higher loadings. An angle θ of more than 90° reduces load potential while an angle θ of less than 90 inhibits assembly of the panels and the clip, and can make it not possible to assemble. The wings are generally curved and extend from the stem at an angle θ of 100° to 155°, specifically, 35° to 75°, and more specifically, 40° to 50°. For example, clips having an angle θ of 90° have a loading capacity of 100 pounds per square foot (psf), while at an angle of 135°, the clip (comprising the same material and thickness), has a loading capacity of less than 80 psf.

The length of the clip (i.e., in the Z direction) is also dependent upon desired structural integrity (e.g., wind load resistance). When maximum wind load resistance is desired, the clip length is equal to the length of the panel. When less resistance is needed, the clip can have a length that is less than or equal to 50% of the length of the panel, specifically less than or equal to 25% of the length of the panel, and more specifically, less than or equal to 10% of the length of the panel. For example, the clip length can be less than or equal to 24 inches (61 centimeters (cm)), specifically, less than or equal to 12 inches (30.5 cm), more specifically, less than or equal to 6 inches (15.2 cm), yet more specifically, less than or equal to 3 inches (7.6 cm), and even less than or equal to 2 inches (5.1 cm).

In addition to the cross-member(s) 24 and/or wing(s) 36, the engagement can further comprise flange(s) 38. The flange(s) are configured to receive a portion of the connector and/or fastener(s) (e.g., to receive protrusion 120 into region 42 defined by flange(s) 38; see FIGS. 20 and 21; and/or to receive fastener 302 (see FIGS. 14 and 15)). Therefore, the flange(s) 38 can optionally be threaded, and/or comprise an adhesive or bonding agent, e.g., to facilitate retention between the clip and the connector. In addition to the flange, support structure 40 may extend outward from the flange and to the wing to provide additional structural integrity to the flange (see FIGS. 14 and 17). The geometry of the support structure is preferably complementary (e.g., the negative) of the geometry of the portion of the connector and/or collector to which it will be adjacent when assembled.

The stem 22 extends from a base 18 (e.g., from the foot 28) to the engagement. Therefore, if the engagement is configured to be located in the opening 212, the stem 22 will have a length that is less than the thickness of the panel, while if the engagement is configured to physically contact the surface 214 of the side collector, the stem 22 will have a length that is greater than or equal to the thickness of the panel (measured in the Y plane).

Figure 37:
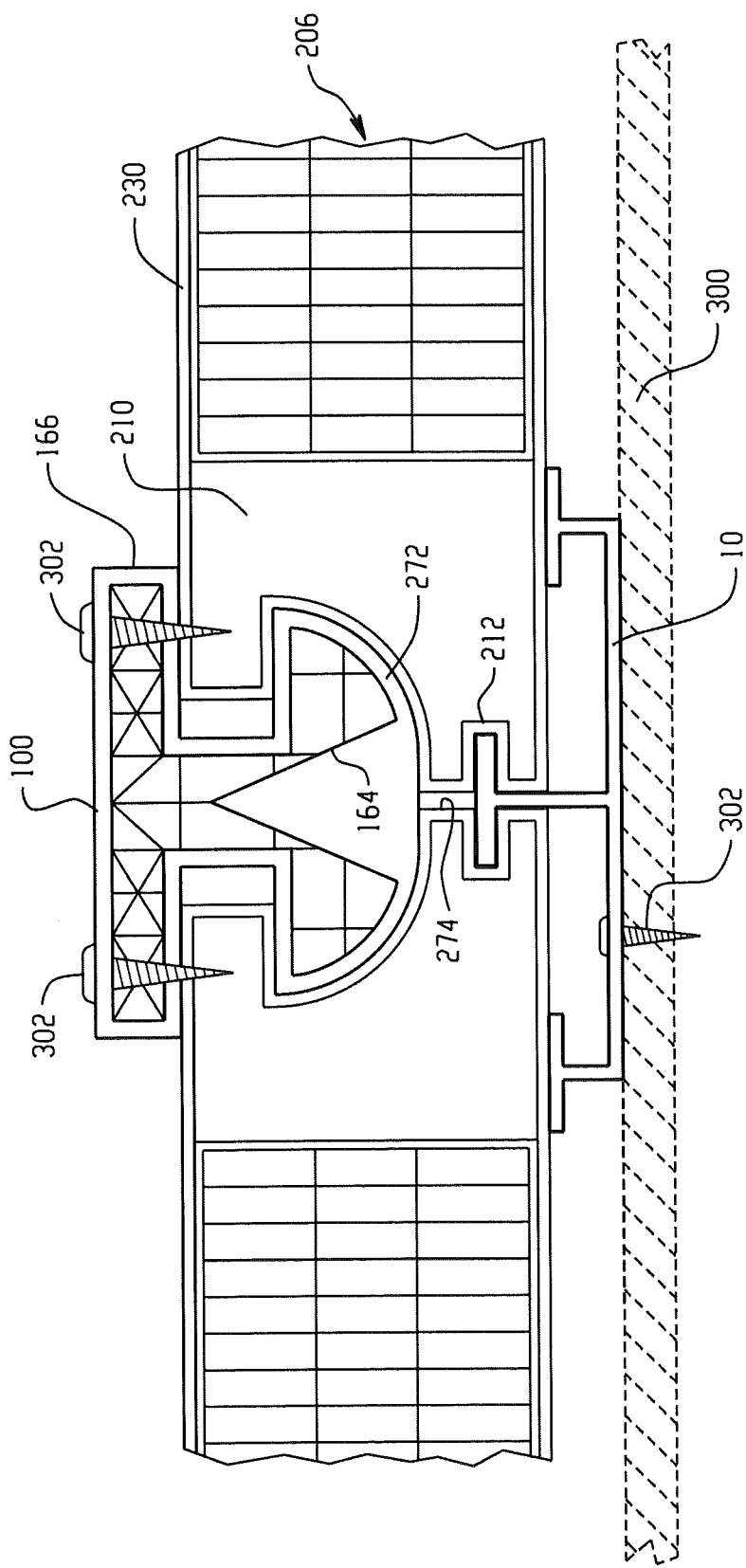
FIG. 37 is a side view of an embodiment wherein the connector is the male component and the side collector is the female component of an exemplary connector assembly.

Referring to FIG. 37, this figure is intended to show that the above configurations can be reversed such that the connector is the male element and the side collectors form the female element to enable mating of these components. In this exemplary embodiment, when the side collectors are assembled together, the joint walls 274 form the cavity 272. As with the other embodiments, any complementary mating engagement can be employed, such as snap-fit, tongue-and-groove, etc. The connector can further be attached to one or both of the side collectors with a fastener 302. As can be seen from the figure, this arrangement enables a small profile since there is a minimum amount of connector and no side collector, extending away from the panels. The distance that the support 166 of the side collector extends away from the side collector 210 is dependent upon the size of the panels and the clips. For example, the support 166 can have a thickness (measured in the Y direction), that is less than or equal to 30% of the thickness of the panel (measured in the Y direction), specifically, less than or equal to 20%, and even less than or equal to 10%. In some embodiments, the support has a thickness of less than or equal to 40 mm, specifically, less than or equal to 30 mm, and more specifically, less than or equal to 20 mm, and even less than or equal to 10 mm.

Figure 38:
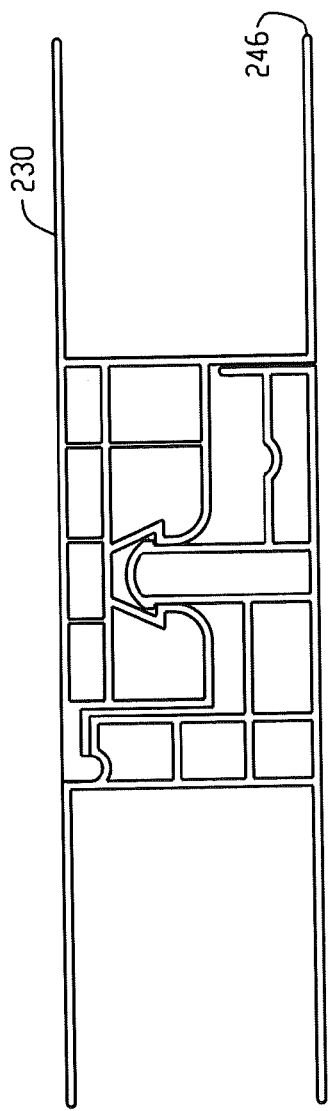
FIG. 38 is a side view of an exemplary embodiment of a side collector configured to mate with another side collector, e.g., snap-fit, without the use of a connector.
Figure 39:
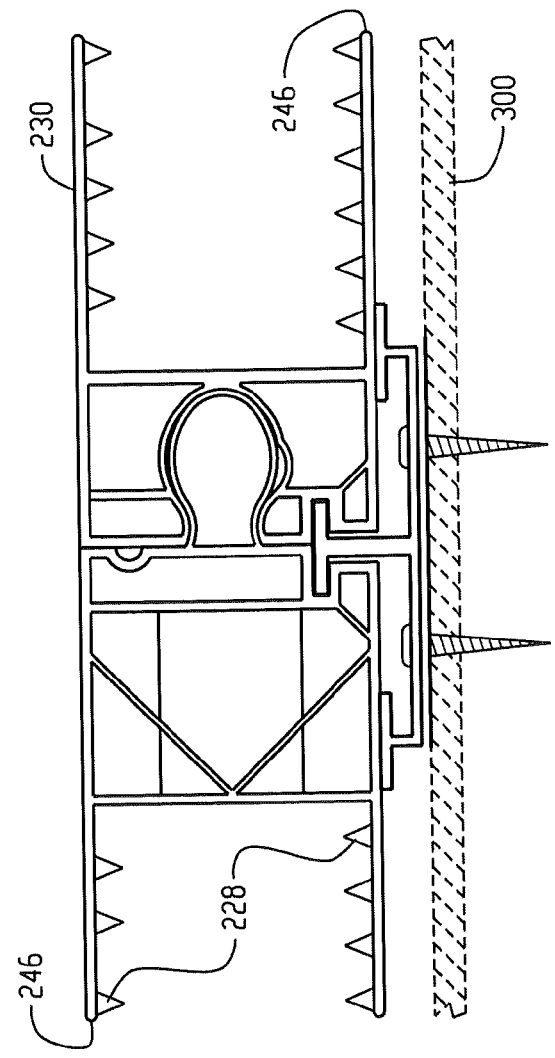
FIG. 39 is a side view of an exemplary embodiment of a side collector configured to mate with another side collector, e.g., tongue and groove, without the use of a connector.

Referring to FIGS. 38 and 39, exemplary embodiments illustrating connector assemblies that use the side collectors to hold the panels together without the need for connectors. In these embodiments, mating pairs of side collectors have complementary geometries (e.g., snap-fig (FIG. 38), or tongue-and-groove (FIG. 39)). In these embodiments, the side collectors do not have mirror geometries with each other (e.g., as is illustrated in many of the other figures. They have complementary, mating geometries that enable the two side collectors to fixedly mate (e.g., to hold together so as separate only when intentionally disassembled). In many embodiments, of these side collectors, and even of the above connector/side collector groups, the elements permanently mate (e.g., once the elements are assembled they cannot be disassembled without breaking one or more of the components).

The connector, side collector, and clip can, independent of the other elements, comprise any material that gives the desired properties (e.g., light transmission, insulation, strength, durability, and/or impact resistance, etc.). For example, they can each, independently comprise a metal (e.g., aluminum), a polymeric material (e.g., acrylic, polycarbonate, etc.), or combinations comprising at least one of the foregoing. Panels, side collectors, and/or connectors can optionally, independently, be solid or hollow (e.g., multiwall, for example comprising support structures, such as ribs). If the ribs are present, the density, configuration (straight, angled, parallel, perpendicular, etc.) of the ribs, is merely dependent upon the desired structural integrity and transmissivity of the particular element. For the side collectors and connectors, the ribs can have a thickness of up to 1 mm, specifically, 0.25 to 0.75 mm, and more specifically, 0.35 to 0.6 mm. In some embodiments, the diagonal ribs have a greater thickness than the parallel and/or perpendicular ribs (wherein parallel and perpendicular are determined in relation to the X direction). Diagonal ribs are ribs that are neither parallel nor perpendicular. In other words diagonal ribs not parallel or perpendicular to the panel outer surface when the element (collector or connector) is attached to the panel. Diagonal ribs provide improved stiffness in all directions compared to vertical and horizontal ribs. Ribs, particularly diagonal ribs, can be used to tune the degree of stiffness (e.g., flexibility of the elements). Desirably, the connector engagement region of the side collector is stiff (rigid such that it does not flex or bend when being assembled with the connector), while the connector has flexible sides 156 to enable it to be assembled over the side collector.

Similarly the panels can be solid, hollow, or a combination thereof (e.g., can be multiwall panels wherein cavities of the panels are hollow and may optionally be filled, e.g., comprise a fluid (such as gas, liquid and/or gel)), depending on the desired properties of the structure (e.g., soundproof, heat transmission, light transmission, weight, etc.). For example, the panels can optionally be arranged so that there is a space between adjacent stacked panels (e.g., see FIGS. 15 and 18) or without space between the adjacent stacked panels (e.g., see FIG. 12), and the panels can be solid, hollow, and/or filled (with a fluid such as a liquid, gel, and/or gas), with a variety of rib configurations (e.g., see FIGS. 12, 15, and 18).

If multiwall panels are used, any number of layers or sheets can be used, with any combination of support structures being contemplated for use. Owing to the connector assemblies (e.g., to the separate side collectors), one can choose a panel having any desired thickness, structure (multiwall or solid), color, width/length, and shape, and adapt its edges to bear edge connectors having the desired attachment structure, and affix it to other panels having edge connectors with complementary attachment structure. Standard panel thicknesses are 4, 4.5, 6, 8, 10, 16, 20, 25, 32, 35, 40, 45 and 50 mm, and further, different varieties of multiwall panels are available, generally having 2 to 10 layers, specifically, 2 to 6 layers (e.g., with 1 to 5 cells across the panel thickness). Also, the cavities can have a variety of internal structures (rectangular passages, triangular passages, etc.). Furthermore, conceivably, due to the flexibility attained with the side collectors, radically different panels (e.g., a 4 mm solid panel and a 32 mm multiwall panel) can be fit together, so long as the panels were each fit with side collectors having complementary attachment structures.

Once the side collector is attached to the panel (or if it is integral) assembly of the panels with the connector assembly can comprise inserting a clip into the side collector (e.g., where it engages the rectangular cut out). In other words, sliding the cross-member into the opening in the side collector. The clip can then be fastened to the support. A second panel, with side collector attached, can be slid up against the first panel so that the two touch or are in close proximity and so that the side collector of the second panel engages the clip. Finally, the connector is attached to the extended legs of the side collectors (i.e., to the connector engagement region) to secure everything together.

The connector(s), collectors, and clips can be formed using various techniques, such as extrusion (e.g., a metal/plastic co-extrusion, a plastic coextrusion with a caplayer (e.g., for ultraviolet protection, and so forth)). The metal/plastic co-extrusion could be used to attain enhanced rigidity to withstand very high forces like hurricane force winds. The metal could be incorporated in the area(s) of the plastic. For example, referring to FIG. 31, the metal 260 could be coextruded with the plastic to provide enhanced structural integrity to the arms 230, opening 212, and/or part or all of the joint side of the collector (e.g., from the bottom to the opening 212). In some embodiments, the metal is coextruded in the area of one or both arms, and/or along the base 258, and/or along the joint wall 254. The metal can extend up the joint wall 254 along the entire body portion, and/or from the base 258 up to and/or through the opening 212 (if present). In some embodiments, the metal is coextruded along the base and joint wall, but not along the arms.

An advantage of the present method is that bonding secondary elements (e.g., collectors) to either multiwall or solid sheet products relying on adhesive systems are messy and have an extensive manual element. Ultrasonic welding techniques employed in the past resulted in poor bond strength and/or crushed multiwall panels. Other mechanical fastening or heat welding techniques resulted in surface blemishes or other unsightly marks on the materials surface. The technique disclosed herein includes a bonding technique which provides for an intimate bond between similar materials making up the panel and the attachment. The use of the energy directors can facilitate the bond between the attachment elements (the side collector and the panel, the connector and the side collector, etc. (e.g., standing seam leg, tongue or groove attachment, snap attachment, etc)). It was discovered that the inclusion of these energy directors enables the use of ultrasonic welding without crushing the multiwall panel or creating a weak bond between two flat polymer surfaces.

The various connectors, collectors, and assemblies disclosed herein address the issue of needing expensive aluminum extrusions for connectors. The present assemblies provide enough strength to withstand hurricane force (200 mph) winds with the use of plastic connector and collectors, (or the side collectors when no connector is used). The combination of the profile structure and the clips that connects the panels to support (e.g., rafter, etc.) has been modeled to provide enough strength to withstand these high loads.

Additionally, with the separate side collectors, substantial reduction in shipping costs can be attained. Since the panels do not include the side collectors, they can be packaged in a much smaller area, thereby allowing shipping of greater than or equal to 40% more product in the same space, with greater than or equal to 50% believe possible.

In one embodiment, a connector assembly can comprise: a connector and a pair of side collectors. Each side collector can comprise a connector engagement region having a size and geometry to mate with the connector so as to hold ends of two adjacent panels together, and a panel engagement region comprising a receiving area having an energy director extending into the receiving area, and having a size to attach onto an edge of the panel.

In another embodiment, a connector assembly can comprise: a first side collector, comprising a first panel engagement region comprising a first receiving area that has a size to attach onto an edge of a first panel; and a second side collector, comprising a second panel engagement region comprising a second receiving area that has a size to attach onto an edge of a second panel. The first side collector and second side collector can be configured to directly mate with each other to hold to panels together.

In yet another embodiment, a connector assembly can comprise: a pair of side collectors, and a connector having a support and an extension protruding therefrom. Each side collector can comprise a cavity that when assembled with the other side collector forms a connector engagement region, and a panel engagement region comprising a receiving area having a size to attach onto an edge of the panel. The extension and the cavity can have a size and shape to enable the extension to be inserted into the cavity so as to hold ends of two adjacent panels together. The connector can be further configured to be attached to each side collector with a fastener.

In an embodiment, a connector can comprise: two cavities defined by flexible walls, wherein each of the cavities has a geometry and is configured to mate with connector engagement regions from a pair of side collectors; and a header located between the two cavities. The cavities can enable two sets of panels to be stacked and connected with the connector.

In an embodiment, a side collector comprises: a connector engagement region comprising head having a size and geometry to mate with a panel connector; and a panel engagement region comprising a receiving area having an energy director extending into the receiving area, and having a size to attach onto an end of a panel.

In the various embodiments: (i) the connector assembly can further comprise a clip, wherein the clip has a base that can be attached to a support, an engagement, and a stem extending therebetween; wherein the panel engagement region further comprises an opening in a joint wall on a side of the panel engagement region opposite the receiving area, wherein the opening is configured to receive the engagement; and/or (ii) the connector assembly can further comprise a clip, wherein the clip has a base that can be attached to a support, an engagement, and a stem extending therebetween; wherein the base comprises elements that, when assembled with the connector, collector, and panels, the panels will be level; and/or (iii) the connector assembly can further comprise a clip, wherein the clip has a base that can be attached to a support, an engagement, and a stem extending therebetween; wherein the base comprises a "U" shaped section formed by a side and a leg, and wherein the side and leg have a length that is greater than a height of a fastener head, and an area extending from the side, away from the leg to another side; and/or (iv) the connector assembly can further comprise a clip, wherein the clip has a base that can be attached to a support, an engagement, and a stem extending therebetween; wherein the base comprises a "U" shaped section formed by a foot connected to the stem and extending perpendicular thereto, and legs extending from the foot in a Y direction toward the engagement, and wherein the legs have a length that is greater than a height of a fastener head; and/or (v) the connector assembly can further comprise a clip, wherein the clip has a base that can be attached to a support, an engagement, and a stem extending therebetween; wherein the engagement has threaded flanges, and wherein the engagement has a complementary geometry to be disposed between the connector and the collector; and/or (vi) the receiving area can be defined by comprises an arm extending from a wall, and wherein arm comprises a plurality of the energy directors, and wherein one of the energy directors is located at the end of the arm away from the connector engagement region; and/or (vii) the connector assembly can further comprise a second arm extending from an opposite end of the wall to define the receiving area, wherein the second arm comprises a plurality of the energy directors, and wherein the energy directors extending from the second arm are staggered with respect to the energy directors extending from the first arm, except for an optional energy director located at the end of the second arm opposite the wall; and/or (viii) the receiving area can be defined by a wall with arms extending therefrom, wherein the arms can each have an energy director protruding into the receiving area from an end of the arm (e.g., the end of the arm opposite the wall); and/or (ix) on a side of the side collector opposite the receiving area is a joint wall, wherein the joint wall can be non-perpendicular as determined with respect to an arm of the receiving area, such that, when two complementary side collectors are assembled together, a thermal expansion space is formed between adjacent joint walls; and/or (x) on a side of the side collector opposite the receiving area is a joint wall, wherein when two complementary side collectors are assembled together, a thermal expansion space is formed between adjacent joint walls, and wherein the connector assembly further comprises a spacer located in the thermal expansion space; and/or (xi) the panel engagement region can further comprise a body portion located between the receiving area and the connector engagement region, and wherein the body portion comprises diagonal ribs; and/or (xii) the connector can be permanently mated to a pair of side collectors; and/or (xiii) a pair of complementary side collectors can be permanently mated together; and/or (xiv) the first side collector and the second side collector can have a mating geometry selected from the group consisting of tongue and groove, and snap-fit; and/or (xv) the connector and a pair of side collectors can have a mating geometry selected from the group consisting of tongue and groove, and snap-fit; and/or (xvi) the first side collector can further comprise a first wall with two first arms extending therefrom to define the first receiving area and first energy directors extending from the first arms into the first receiving area, and the second side collector can further comprise a second wall with two second arms extending therefrom to define the second receiving area and second energy directors extending from the second arms into the second receiving area; and/or (xvii) the first side collector and the second side collector can have complementary openings configured to receive an engagement of a clip that is configured to secure the first side collector and the second side collector to a support (e.g., the engagement can extend from an end of a stem that has a length that is less than a height of the first receiving area); and/or (xviii) the extension (e.g., connector male extension) and the cavity (e.g., the side collector female cavity) can form a mating geometry selected from the group consisting of tongue and groove, and snap-fit; and/or (xix) the support (e.g., connector support) can have a thickness of less than or equal to 20 mm (e.g., as measured in the Y direction); and/or (xx) the connector can further comprise a first slot on a side of the connector and between the cavities, wherein the first slot has a size and geometry to receive and end of a panel without a side collector; and/or (xxi) the connector can further comprise a second slot on another side of the connector opposite the first slot and between the cavities, wherein the second slot has a size and geometry to receive and end of another panel without a side collector; and/or (xxii) the header (e.g., the header of the connector) can be configured to receive a fastener that attaches the connector to flanges of a clip that is configured (e.g., designed) to secure the connector to a support structure with a fastener. The panel assemblies can comprise any of the above side collectors, and/or connectors, and/or clips.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A connector assembly, comprising:
   a connector; and
   a pair of side collectors, each comprising:
      a connector engagement region having a size and geometry to mate with the connector so as to hold ends of two adjacent panels together; and
      a panel engagement region comprising a receiving area with an energy director extending into the receiving area, and having a size to attach onto an edge of a panel;
   wherein on a side of the side collector opposite the receiving area is a joint wall, wherein the joint wall is non-perpendicular as determined with respect to an arm of the receiving area, such that, when two complementary side collectors are assembled together, a thermal expansion space is formed between adjacent joint walls.

2. The connector assembly of claim 1, further comprising a clip, wherein the clip has a base that can be attached to a support, an engagement, and a stem extending therebetween; wherein the panel engagement region further comprises an opening in a joint wall on a side of the panel engagement region opposite the receiving area, wherein the opening is configured to receive the engagement.

3. The connector assembly of claim 1, further comprising a clip, wherein the clip has a base that can be attached to a support, an engagement configured to engage the side collectors, and a stem extending therebetween; wherein the base comprises elements that, when assembled with the connector, collector, and panels, the panels will be level.

4. The connector assembly of claim 1, further comprising a clip, wherein the clip has a base that can be attached to a support, an engagement configured to engage the side collectors, and a stem extending therebetween; wherein the base comprises a U-shaped section formed by a side and a leg, and wherein the side and leg have a length that is greater than a height of a fastener head, and an area extending from the side, away from the leg to another side.

5. The connector assembly of claim 1, wherein the receiving area is defined by an arm extending from a wall; wherein the arm comprises a plurality of the energy directors, and wherein one of the energy directors is located at the end of the arm away from the connector engagement region.

6. The connector assembly of claim 1, further comprising a second arm extending from an opposite end of the wall to define the receiving area, wherein the second arm comprises a plurality of the energy directors, and wherein the energy directors extending from the second arm are staggered with respect to the energy directors extending from the first arm, except for an optional additional energy director located at the end of the second arm opposite the wall.

7. The connector assembly of claim 1, wherein the connector further comprises a connector protrusion that extends into a valley formed by the pair of side collectors.

8. The connector assembly of claim 1, wherein the assembly is plastic and wherein the assembly provides enough strength to withstand winds of 200 mph without disassembly.

9. The connector assembly of claim 1, wherein the connector engagement region from the pair of side collectors jointly forms a single cavity that receives the connector.

10. The connector assembly of claim 1, wherein the connector has a connector cavity.

11. A connector assembly, comprising:
    a connector; and
    a pair of side collectors, each comprising:
       a connector engagement region having a size and geometry to fixedly mate with the connector so as to hold ends of two adjacent panels together such that the connector and the pair of side collectors are intentionally disassemblable; and
       a panel engagement region comprising a receiving area with an energy director extending into the receiving area, and having a size to attach onto an edge of a panel; wherein the panel engagement region further comprises a body portion located between the receiving area and the connector engagement region, and wherein the body portion comprises diagonal ribs.

12. The connector assembly of claim 11, further comprising
    a clip, wherein the clip has a base that can be attached to a support, an engagement, and a stem extending therebetween; wherein the panel engagement region further comprises an opening in a joint wall on a side of the panel engagement region opposite the receiving area, wherein the opening is configured to receive the engagement.

13. The connector assembly of claim 11, further comprising
    a clip, wherein the clip has a base that can be attached to a support, an engagement configured to engage the side collectors, and a stem extending therebetween; wherein the base comprises elements that, when assembled with the connector, collector, and panels, the panels will be level.

14. The connector assembly of claim 11, further comprising
    a clip, wherein the clip has a base that can be attached to a support, an engagement configured to engage the side collectors, and a stem extending therebetween; wherein the base comprises a U-shaped section formed by a side and a leg, and wherein the side and leg have a length that is greater than a height of a fastener head, and an area extending from the side, away from the leg to another side.

15. The connector assembly of claim 11, wherein the receiving area is defined by an arm extending from a wall; wherein the arm comprises a plurality of the energy directors, and wherein one of the energy directors is located at the end of the arm away from the connector engagement region.

16. The connector assembly of claim 15, further comprising a second arm extending from an opposite end of the wall to define the receiving area, wherein the second arm comprises a plurality of the energy directors, and wherein the energy directors extending from the second arm are staggered with respect to the energy directors extending from the first arm, except for an optional additional energy director located at the end of the second arm opposite the wall.

17. The connector assembly of claim 11, wherein the connector further comprises a connector protrusion that extends into a valley formed by the pair of side collectors.

18. The connector assembly of claim 11, wherein the assembly is plastic and wherein the assembly provides enough strength to withstand winds of 200 mph without disassembly.

19. The connector assembly of claim 11,
wherein the connector engagement region from the pair of side collectors jointly forms a single cavity that receives the connector.

20. The connector assembly of claim 11, wherein the connector has a connector cavity.

* * * * *